United States Patent
Jassal et al.

(10) Patent No.: US 12,045,370 B2
(45) Date of Patent: *Jul. 23, 2024

(54) SYSTEM AND METHOD FOR SERVING SUBJECT ACCESS REQUESTS

(71) Applicant: Egnyte, Inc., Mountain View, CA (US)

(72) Inventors: Amrit Jassal, Morgan Hill, CA (US); Debjit Bhattacharjee, Dublin, CA (US); Vikram Chandrasekhar, Sunnyvale, CA (US); Tomasz Marek Kaczmarek, Poznan (PL); Willy Lanig Picard, Poznan (PL); Marcin Artur Zablocki, Poznan (PL)

(73) Assignee: Egnyte, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/992,059

(22) Filed: Nov. 22, 2022

(65) Prior Publication Data

US 2023/0161904 A1     May 25, 2023

Related U.S. Application Data

(63) Continuation of application No. 16/830,652, filed on Mar. 26, 2020, now Pat. No. 11,514,188.

(60) Provisional application No. 62/824,809, filed on Mar. 27, 2019.

(51) Int. Cl.
*G06F 21/62*      (2013.01)
*G06F 16/903*     (2019.01)
*G06N 20/00*      (2019.01)

(52) U.S. Cl.
CPC .... *G06F 21/6245* (2013.01); *G06F 16/90344* (2019.01); *G06N 20/00* (2019.01); *G06F 2221/2103* (2013.01); *G06F 2221/2141* (2013.01)

(58) Field of Classification Search
CPC .................................................. G06F 21/6245
See application file for complete search history.

(56) References Cited

U.S. PATENT DOCUMENTS

| | | | | |
|---|---|---|---|---|
| 2018/0341785 A1* | 11/2018 | Barday | ................. | H04L 63/102 |
| 2019/0050595 A1* | 2/2019 | Barday | ................. | G06Q 10/107 |
| 2019/0102575 A1* | 4/2019 | Barday | ................. | H04L 63/104 |

* cited by examiner

*Primary Examiner* — Simon P Kanaan
(74) *Attorney, Agent, or Firm* — Larry E. Henneman, Jr.; Henneman & Associates, PLC

(57) ABSTRACT

Systems and methods for serving subject access requests (SARs) are disclosed. A network connection is established with a user. An SAR, including at least one piece of personal data corresponding to an entity associated with said user, is received from the user via the network connection. Text data is extracted from a plurality of data objects, the data objects including personal data associated with the user. The text data is then processed to identify instances of names and instances of personal data within the text data. Associations are generated between identified names and identified personal data. A subset of the identified personal data that corresponds to the entity is identified based on the associations. A response to the SAR is provided, based at least in part on the identified personal data corresponding to the entity.

20 Claims, 18 Drawing Sheets

Please select each of the following pieces of personally identifiable information that you are associated with: ⎬ 802

☒ SSN: ###-##-1996
☒ E-Mail Address: Kobe24@LALakers.org
☒ Credit Card Number: ####-####-####-0113
☒ Credit Card Number: ####-####-####-7346
☒ Password: **********b.1978
☐ Password: **********d.2020

⎱ 804

806

[Confirm] — 808

SYSTEM AND METHOD FOR SERVING SUBJECT ACCESS REQUESTS

RELATED APPLICATIONS

This application is a continuation of copending U.S. patent application Ser. No. 16/830,652, filed Mar. 26, 2020 by at least one common inventor, which claims the benefit of priority to U.S. Provisional Patent Application 62/824,809, filed on Mar. 27, 2019 by at least one common inventor, both of which are incorporated herein by reference in their respective entireties.

BACKGROUND OF THE INVENTION

Field of the Invention

This invention relates generally to data privacy, and more particularly to serving Subject Access Requests (SARs), as required, for example, by privacy regulations.

Description of the Background Art

As computer technology has become nearly ubiquitous, individuals and governments have become increasingly concerned with data privacy. Nearly every modern business collects and stores personal data of natural persons such as its employees and customers. Such personal data can include national identifiers, payment information, biometrics and online browsing details. Privacy regulations, for example the General Data Protection Regulation (GDPR), seek to protect this personal data by granting data subject rights to individuals. These rights compel businesses to respond in a timely manner to Subject Access Requests (SARs) from individuals about their personal data.

An individual's SAR can include one or more of at least three distinct requests: first, to obtain a summary of their personal data (i.e. the right to be informed); second, to download files containing their personal data (i.e. the right for data portability); and third, to purge any stored personal data (i.e. the right to be forgotten). A typical SAR starts with some preliminary information such as the request type, the data subject's name and at least one personal identifier to help narrow down the results.

Current SAR solutions only support a basic keyword search for an individual's content such as a name or a numeric identifier. This solution is not sufficient, because in a majority of cases the SAR cannot be fully served. These shortcomings put businesses storing personal content at risk of falling out of compliance with regulations like GDPR.

SUMMARY

The present invention overcomes the problems associated with the prior art by providing an intelligent approach to serving SARs. The invention utilizes several services to identify references to people and personal data in data files stored by a business. A personal data graph can then be constructed utilizing the identified references and personal data, in order to associate a recognized name with identified personal data. The personal data graph facilitates responding to an SAR quickly and efficiently. An SAR case management system is additionally provided to process access requests and serve any relevant documents by querying the personal data graph for generated variations of the name provided in the request, and returning the documents to the users with additional personal information corresponding to other persons masked.

Example methods for serving subject access requests (SARs) is disclosed. One example method includes accessing and analyzing a data store. The data store includes personal information related to a plurality of persons. The data is analyzed to identify associations between information in the data store and individual persons of the plurality of persons. The example method additionally incudes generating a data set indicative of the associations between the information in the data store and the individual persons of the plurality of persons. The example method additionally includes receiving a request, analyzing the data set, and responding to the request. The received request is from a particular one of the individual persons and is related to information in the data store associated with the particular one of the individual persons. The data set is analyzed to identify information in the data store associated with the particular one of the individual persons. The response to the request is based at least in part on the identified information in the data store associated with the particular one of the individual persons.

In a particular example method, the step of analyzing the data store includes extracting text data from a plurality of data objects stored on the data store. The data objects can include the personal information. The extracted text data is processed to identify instances of names within the data objects. Each of the names can correspond to one of the individual persons of the plurality of persons. The extracted text data is also processed to identify instances of personal data within the data objects.

In an example method, the step of generating a data set can include generating a first record, generating a second record, and generating a third record. The first record associates a first identified instance of a name with a first identified instance of personal data. The first record also indicates that the first identified instance of a name and the first identified instance of personal data were identified within a first data object of the plurality of data objects. The second record associates the first identified instance of a name with the first data object, and the third record associates the first identified instance of personal data with the first data object.

In an example method, the step of analyzing the data set includes identifying a subset of the identified instances of personal data corresponding to the particular one of the individual persons based on the associations. In addition, the step of responding to the request includes responding to the request based at least in part on the subset of the identified instances of personal data corresponding to the particular one of the individual persons.

In an example method, the step of identifying a subset of the identified instances of personal data corresponding to the particular one of the individual persons includes determining that the first identified instance of a name corresponds to the particular one of the individual persons. The step of identifying the subset of the identified instances of personal data corresponding to the particular one of the individual persons also includes using the first identified instance of a name to locate the first record and using the first record to identify the first identified instance of personal data.

In an example method the step of determining that the first identified instance of a name corresponds to the particular one of the individual persons includes receiving a provided name from the particular one of the individual persons and generating a plurality of alternate versions of the provided name. The step of determining that the first identified instance of a name corresponds to the particular one of the individual persons also includes determining that the first identified instance of a name matches the provided name or one of the plurality of alternate versions of the provided name.

In a particular example method, the step of generating a first record includes entering into the first record a first distance between the first identified instance of a name and the first identified instance of personal data within the first data object of the plurality of data objects. In addition, the step of identifying a subset of the identified instances of personal data corresponding to the particular one of the individual persons can include determining that the first identified instance of personal data corresponds to the particular one of the individual persons based at least in part on the first distance.

An example method can additionally include providing a verification request and receiving a verification response. The verification request is provided to the particular one of the individual persons, and the verification request includes the first identified instance of personal data. The verification response is received from the particular one of the individual persons, and the response confirms that the first identified instance of personal data corresponds to the particular one of the individual persons.

The example method can additionally include providing a first copy of the first digital object to the particular one of the individual persons. When the first digital object includes at least one additional identified instance of personal data that does not correspond to the particular one of the individual persons, the additional identified instance of personal data can rendered inaccessible (e.g., be redacted, removed, etc.) to the particular one of the individual persons in the first copy. The example method can also include deleting the first digital object, when the first digital object contains only identified instances of personal data that correspond to the particular individual person.

Where the first digital object contains identified personal data corresponding to more than one of the individual persons, the method can include generating a first copy of the first digital object and redacting every instance of the first identified instance of a name and every instance of the first identified instance of personal data from the first copy. Then, the first digital object is replaced with the redacted first copy of the first digital object.

In a particular example method, the step of receiving the request from the particular one of the individual persons includes receiving at least one piece of personal data corresponding to the particular one of the individual persons. In addition, the step of identifying a subset of the identified instances of personal data corresponding to the particular one of the individual persons based on the associations includes using the at least one piece of personal data to identify associated data in the data set.

In an example method, the step of processing the text data to identify instances of personal data within the data objects includes identifying a first string indicative of the presence of personal data of a first type in the text data. This processing step can also include identifying a second string constituting personal data of a second type in the text data and associating the first string with the second string if the first type and the second type correspond. The step of processing the text data to identify instances of personal data within the data objects can additionally include saving and comparing first and second location information. The first location information can be indicative of a first location of the text data of the first string, and the second location information can be indicative of a second location of the text data of the second string. The saved first location information and the saved second location information can be compared to verify that the first string and the second string correspond to one another.

In the example methods, the step of identifying a second string constituting personal data of a second type in the text data includes utilizing a machine learning model trained to detect a plurality of patterns indicative of a plurality of types of personal data.

Example systems for serving subject access requests (SARs) are also disclosed. An example system includes at least one hardware processor and memory storing data and code. The code includes a set of predefined instructions that cause the hardware processor to perform a corresponding set of operations when executed by the hardware processor. The example system also includes platform services, an association layer, a user interface, and a case management system. The platform services include a first subset of the set of predefined instructions, which is configured to access a data store. The data store includes personal information related to a plurality of persons. The association layer includes a second subset of the set of predefined instructions, which is configured to analyze the data store to identify associations between information in the data store and individual persons of the plurality of persons. The association layer also includes a third subset of the set of predefined instructions, which is configured to generate a data set indicative of the associations between the information in the data store and the individual persons of the plurality of persons. The user interface is electrically coupled and configured to receive a request from a particular one of the individual persons related to information in the data store associated with the particular one of the individual persons. The case management system includes a fourth subset of the set of predefined instructions, which is configured to analyze the data set to identify information in the data store associated with the particular one of the individual persons. The case management system also includes a fifth subset of the set of predefined instructions, which is configured to respond to the request from the particular one of the individual persons based at least in part on the identified information in the data store associated with the particular one of the individual persons.

In an example system, the second subset of the set of predefined instructions is additionally configured to extract and process text data. The text data is extracted from a plurality of data objects stored on the data store. The data objects can include the personal information. The text data is processed to identify instances of names within the data objects, and each of the names can correspond to one of the individual persons of the plurality of persons. The text data is also processed to identify instances of personal data within the data objects.

In an example system, the third subset of the set of predefined instructions is additionally configured to generate a first record, a second record, and a third record. The first record associates a first identified instance of a name with a first identified instance of personal data. The first record also indicates that the first identified instance of a name and the first identified instance of personal data were identified within a first data object of the plurality of data objects. The second record associates the first identified instance of a name with the first data object, and the third record associates the first identified instance of personal data with the first data object.

In an example system, the fourth subset of the set of predefined instructions is additionally configured to identify a subset of the identified instances of personal data corresponding to the particular one of the individual persons based on the associations. The fifth subset of the set of predefined instructions is additionally configured to respond to the request (from the particular one of the individual persons) based at least in part on the subset of the identified instances of personal data corresponding to the particular one of the individual persons.

In an example system, the fourth subset of the set of predefined instructions can be further configured to determine that the first identified instance of a name corresponds to the particular one of the individual persons, to use the first identified instance of a name to locate the first record, and to use the first record to identify the first identified instance of personal data. The fourth subset of the set of predefined instructions can also be configured to receive a provided name from the particular one of the individual persons, generate a set of alternate versions of the provided name, and determine that the first identified instance of a name matches the provided name or one of the set of alternate versions of the provided name.

In an example system, the third subset of the set of predefined instructions can be further configured to enter into the first record a first distance between the first identified instance of a name and the first identified instance of personal data within the first data object of the plurality of data objects. The fourth subset of the set of predefined instructions can be further configured to determine that the first identified instance of personal data corresponds to the particular one of the individual persons based at least in part on the first distance.

In an example system, the user interface can be configured to provide a verification request to the particular one of the individual persons. The verification request can include the first identified instance of personal data. The user interface can also be configured to receive a verification response from the particular one of the individual persons. The verification response can confirm that the first identified instance of personal data corresponds to the particular one of the individual persons.

In an example system, the user interface can be configured to provide a first copy of the first digital object to the particular one of the individual persons. When the first digital object includes at least one additional identified instance of personal data that does not correspond to the particular one of the individual persons, the additional identified instance of personal data can be rendered inaccessible (e.g., be redacted) to the particular one of the individual persons in the first copy. The case management system can additionally include a sixth subset of the set of predefined instructions, which is configured to delete the first digital object from the data store, if the first digital object contains only identified instances of personal data that correspond to the particular one of the individual persons. The case management system can additionally include a sixth subset of the set of predefined instructions, which is configured to generate a first copy of the first digital object, redact every instance of the first identified instance of a name and every instance of the first identified instance of personal data from the first copy, and replace the first digital object with the redacted first copy of the first digital object.

In an example system, the user interface can be configured to receive at least one piece of personal data corresponding to the particular one of the individual persons. In addition, the fourth subset of the set of predefined instructions can be further configured to utilize the at least one piece of personal data to identify associated data in the data set.

In an example system, the second subset of the set of predefined instructions can be further configured to identify a first string, identify a second string, and associate the first string with the second string. The first string can be indicative of the presence of personal data of a first type in the text data. The second string can constitute personal data of a second type in the text data. The second subset of the set of predefined instructions can associate the first string with the second string if the first type and the second type correspond in a predetermined way.

The second subset of the set of predefined instructions can be further configured to save first location information, save second location information, and compare the saved first location information and second location information. The first location information can be indicative of a first location of the text data of the first string, and the second location information can be indicative of a second location of the text data of the second string. The saved first location information is compared with the saved second location information to verify that the first string and the second string are associated with one another.

In the example systems, a further subset of the second subset of the set of predefined instructions can constitute a machine learning model trained to detect a plurality of patterns indicative of a plurality of types of personal data.

An example system for serving subject access requests (SARs) includes at least one hardware processor and memory storing data and code. The code includes a set of predefined instructions for causing the hardware processor to perform a corresponding set of operations when executed by the hardware processor. Platform services are provided by a first subset of the set of predefined instructions, which is configured to access a data store, which includes personal information related to a plurality of persons. The example system also includes means for analyzing the data store to identify associations between information in the data store and individual persons of the plurality of persons. The example system also includes means for generating a data set indicative of the associations between the information in the data store and the individual persons of the plurality of persons. The example system also includes a user interface electrically coupled and configured to receive a request from a particular one of the individual persons related to information in the data store associated with the particular one of the individual persons. The example system also includes a case management system. The case management system includes means for identifying information in the data store associated with the particular one of the individual persons. The case management system additionally includes means for responding to the request from the particular one of the individual persons based at least in part on the identified information in the data store associated with the particular one of the individual persons.

BRIEF DESCRIPTION OF THE DRAWINGS

The present invention is described with reference to the following drawings, wherein like reference numbers denote substantially similar elements:

FIG. 11 is a diagram illustrating an example user interface for verifying that personal data corresponds to the subject of an SAR;

DETAILED DESCRIPTION

The present invention overcomes the problems associated with the prior art, by providing a versatile, intelligent cloud computing system that facilitates responses to Subject Access Requests (SARs) in a timely, efficient, thorough, and inexpensive manner by businesses. The present invention provides an improvement to a cloud computing system by providing methods for responding to SARs in a manner that is compliant with regulations. The present invention also provides an improvement to the cloud computing system by enabling SAR requests to be carried out on data that has not been previously indexed or organized in any way. In the following description, numerous specific details are set forth (e.g., particular data structures, machine learning algorithms, etc.) in order to provide a thorough understanding of the invention. Those skilled in the art will recognize, however, that the invention may be practiced apart from these specific details. In other instances, details of well-known cloud computing practices (e.g., data transmission, storage, optimization, etc.) and components have been omitted, so as not to unnecessarily obscure the present invention.

Figure 1:
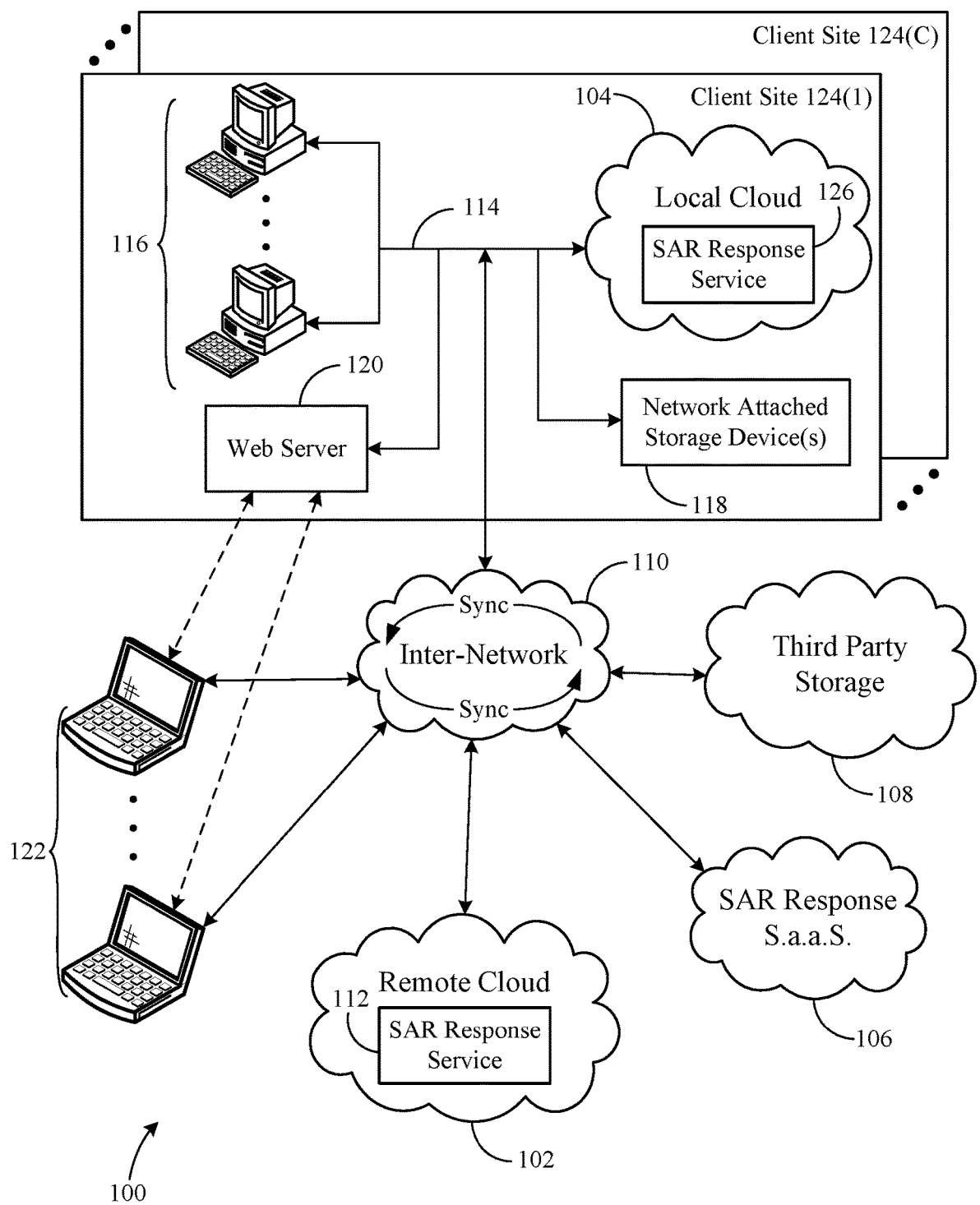
FIG. 1 is a block diagram showing a cloud computing system including several different implementations of SAR response services.

FIG. 1 shows a cloud computing system 100 configured for responding to SARs received by cloud clients. Cloud computing system 100 includes a remote cloud 102, a local cloud 104, an SAR response software-as-a-service (SaaS) cloud 106, and a third-party storage cloud 108, all interconnected via an internetwork 110. Internetwork 110 can be any type of communication network (e.g., the Internet, wide-area network, telecom system, etc.) and can even include multiple different communication networks. For example, remote cloud 102 could connect to local cloud 104 through an enterprise network, while third party cloud storage 108 connects to local cloud 104 through the Internet.

Remote cloud 102 is a distributed remote file storage system and server accessible over internetwork 110. Remote cloud 102 provides data storage and governance services to a particular entity (or a plurality of unassociated particular entities) (e.g., business(s), cloud customer(s), etc.). When remote cloud 102 provides services to multiple entities, remote cloud 102 may be referred to as a multi-tenant file storage system. The data stored on remote cloud 102 is continuously synchronized with corresponding data stored on local cloud 104. Because the data stored on remote cloud 102 may contain personal data related to SARs, remote cloud 102 additionally includes a SAR response service 112. SAR response service 112 analyzes data stored locally (i.e. on remote cloud 102) or remotely (e.g., on local cloud 104, third party cloud storage 108, etc.) in order to provide suitable responses to SARs served to clients of remote cloud 102.

Local cloud 104 stores data associated with the particular entity, which, in the present example embodiment, is an online business, and is accessible through a local network 114. Local clients 116, having access to local network 114, can access data stored on local cloud 104, including data objects, applications, directories, etc. Additional network-attached storage (NAS) devices 118 are connected to local network 114. NAS devices 118 provide additional data storage and can be accessed by local clients 116 through local network 114. A web server 120 is also hosted on local network 114 and provides web services (e.g., a website, e-commerce portal, data storage, etc.) associated with the online business. A plurality of online customers 122 access web server 120 through internetwork 110 to view a website associated with the online business, make online purchases, etc. Local cloud 104, local network 114, local clients 116, NAS devices 118, and web server 120 are hosted on a client site 124(1) (e.g. a business office) associated with the online business. Additional ones of client sites 124(2-c) (e.g. a foreign branch) are also associated with the online business and connected to remote cloud 102 via internetwork 110. Others of client sites 124(2-c) can be associated with different, unaffiliated clients/entities.

Through interacting with web server 120, online customers 122 provide personal data that is subsequently stored on web server 120, NAS devices 118, local cloud 104, remote cloud 102, and/or third party storage 108. This personal data can be the subject of a later SAR. Accordingly, local cloud 104 includes an SAR response service 126 that utilizes locally stored data (i.e. data stored on devices attached to local network 114) to provide suitable responses to SARs served to the online business. SAR response service 126 detects personal data in the local data sources, associates the personal data with individuals, and saves the associations in one or more personal data graphs. The personal data graph(s) are then utilized to respond to SARs adequately. In alternate embodiments SAR response service 126 can also utilize remotely available data, such as that stored in remote cloud 102 or third party cloud storage 108, to generate the personal data graph(s).

SAR response SaaS cloud 106 is an SAR response system that is implemented in the form of remote software-as-a-service. SaaS cloud 106 can be operative on data stored in remote cloud 102, local cloud 104, third party cloud storage 108, NAS devices 118, and/or web server 120. SaaS cloud 106 accesses digital objects (and associated data) stored on the various storage platforms through publicly available application programming interfaces (APIs). More information regarding the access of data by SaaS cloud 106 (as well as by remote cloud 102 and local cloud 104) can be found in U.S. patent application Ser. No. 15/487,947, entitled Hybrid Approach to Data Governance, filed Apr. 14, 2017 by Jassal et al., which has been published as U.S. Patent Application Publication US 2017/0300705 A1, and which is incorporated herein by reference in its entirety.

SAR response services 112, 126, and 102 are generally similar in function to Saas Cloud 106, but require slight differences in implementation due, in part, to their relative location with respect to the underlying data sources and associations with different entities. For example SAR response service 112 has local access to data objects associated with a plurality of different cloud customers and must, therefore, differentiate between data objects belonging to different customers. SAR response service 126 has local access to data objects associated with only the online business associated with local network 114, so has no need to differentiate between data objects associated with different customers, but accesses a variety of data sources over local network 114. Additionally, SaaS cloud 106 accesses data sources over internetwork 110. For these reasons, SAR response services 112, 126, and 106 are similar, but not entirely interchangeable. For the sake of brevity, the present invention will be described in more detail with reference to SAR response service 112, and not SAR response service 106 or SAR response service 126. However, it will be apparent to those skilled in the art how to configure SAR response services 106 and 126 in view of the following description and Jassal et al. cited above.

Third party storage cloud 108 is a distributed remote file storage system and server accessible over internetwork 110. Third party storage cloud 108 is similar to remote cloud 102, but clouds 108 and 102 can be owned and administered by separate cloud service providers. Additionally, third party storage cloud 108 does not include a SAR response service. Therefore, personal data on third party storage cloud 108 must be processed by one or more of SAR response services 112, 126, and/or 106. SAR response services 112, 126, and 106 can access personal data stored on third party storage cloud 108 through publicly available APIs.

Figure 2:
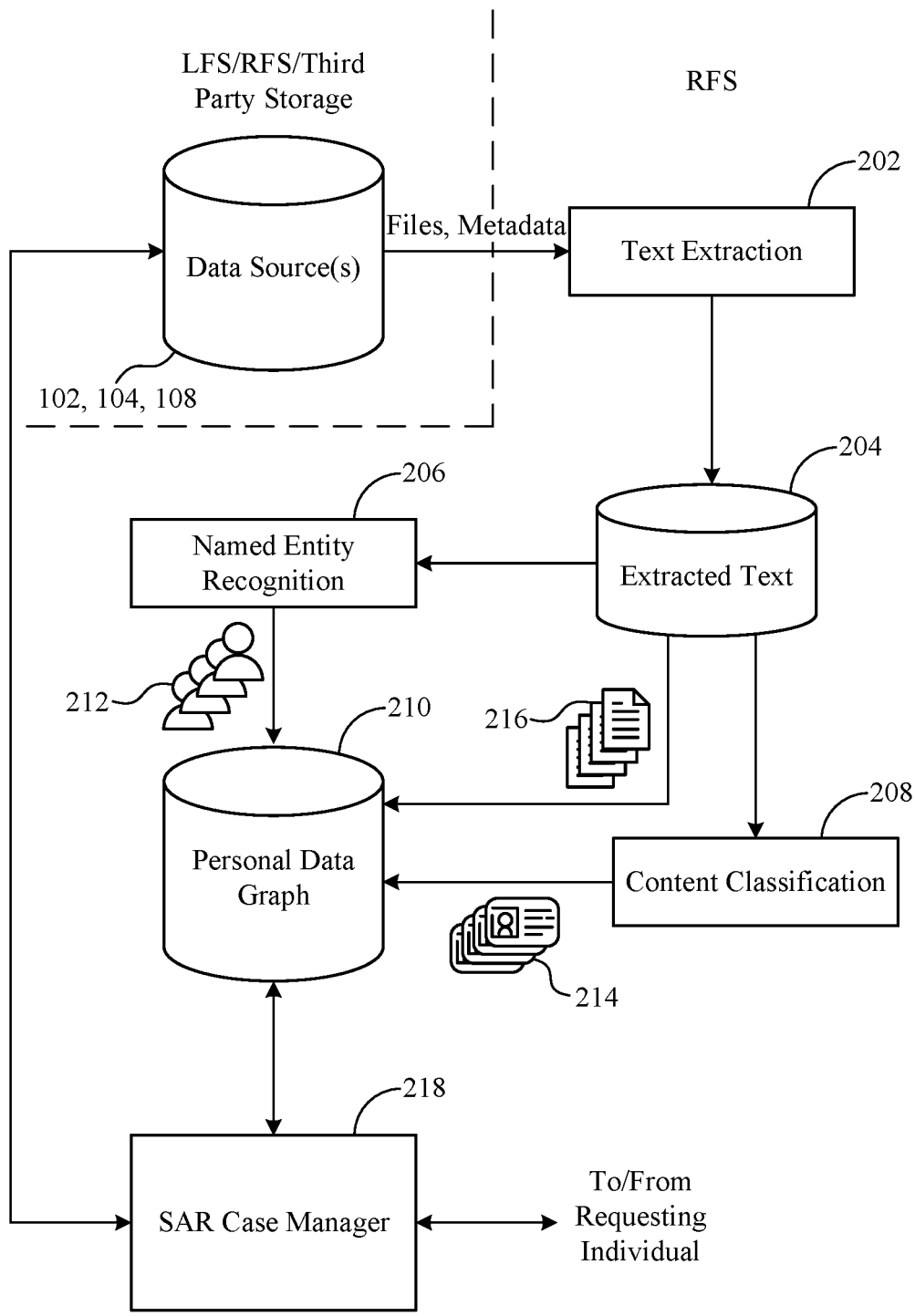
FIG. 2 is a block diagram showing data flow in an example SAR response service.

FIG. 2 is a block diagram showing high-level data flow in SAR response service 112. Files, metadata, directory data, and other data is retrieved from one or more data sources on remote cloud 102, local cloud 104, and/or third party storage 108. Techniques for retrieving this data are described with reference to FIGS. 3A-3D below. The retrieved data is first processed by a text extraction service 202, which extracts textual information from the retrieved data, including from image-based files (e.g., .pdf, .jpg, etc.) by utilizing optical character recognition technology. The extracted text is stored in an extracted text database 204, where it is accessible for additional processing. Database 204 is organized by file, so text data stored there maintains an association to the file (or file metadata) that it originates from. Maintaining such associations provides advantages for serving SARs. For example, the files containing sensitive text can be identified and, thus, downloaded, altered, deleted, etc. in response to an SAR.

Text stored in database 204 is utilized by a named entity recognition service 206 and a content classification service 208 to generate a personal data graph 210. Named entity recognition service 206 recognizes references to people within the text data. In other words, named entity recognition service 206 identifies, for example, names 212 that appear in the text. Content classification service 208 identifies and classifies sensitive personal data 214 within the text data. Such personal data can include credit card numbers, email addresses, social security numbers, plaintext passwords, or any other data with a reasonably identifiable format. Both named entity recognition service 206 and content classification service 208 utilize various validation techniques to limit false positives, misclassifications, etc. Named entity recognition service 206 and content classification service 208 will be described in greater detail with reference to FIG. 6, below.

Personal data graph 210 is constructed to record associations between identified person names 212 and identified personal data 214. Personal data graph 210 includes both person nodes, each representing one of identified person names 212, and data nodes, each representing one instance of identified personal data 214. Person nodes and data nodes are connected transitively by edges, which are generated and/or weighted based on various criteria, such as proximity to one another in a document, number of co-occurrences across documents, etc. The nodes and edges of personal data graph 210 are indicative of the likelihood that a given name 212 corresponds to a given piece of personal data 214. In addition, edges are generated between file nodes and both person nodes and data nodes, indicating which of files 216, identified person names 212, and identified personal data 214 are found. The information represented by the nodes and edges of personal data graph 210 is extremely advantageous for serving SARs.

An SAR case manager 218 serves SARs by utilizing a search service capable of querying the personal data graph to identify the personal data that most likely corresponds to the subject of the request. SAR case manager 218 receives an SAR from a user, typically over the Internet via a web server. The user provides at least a name of the subject of the SAR, which is utilized by SAR case manager 218 to query personal data graph 210 for personal data corresponding to the provided name. First, SAR case manager 218 utilizes a naming service to generate all possible variations of the subject's name (e.g., nicknames, accepted alternatives, different formatting, etc.), before querying personal data graph 210 with each variation, as well as any personal data items provided along with the SAR. Next, SAR case manager 218 presents any identified personal data items to the user for verification. The identified personal data items are appropriately masked to avoid providing the user with sensitive personal information belonging to another person. After receiving verification of the identified personal data items, SAR case manager 218 utilizes them to again query personal data graph 210 and identify a list of documents containing any of the identified personal data items. Finally, depending on the SAR type, SAR case manager 218 provides the list of documents to the user, provides copies of each of the documents (with appropriate masking) to the user, deletes each of the documents, and/or removes the personal data from the documents, etc. Performing any of these actions, alone or in combination, constitutes service of the SAR.

In order for SAR case manager 218 to fully service every SAR, it is advantageous for SAR case manager 218 to have access to the files stored on remote cloud 102, local cloud 104, and/or third party storage 108. For instance, in response to a request for data portability, SAR case manager 218 provides any files containing personal data pertaining to the subject of the request. To illustrate this feature of SAR case manager 218, FIGS. 3A-3D are relational diagrams showing nonlimiting examples of data transfer between the SAR response service (including SAR case manager 218) and the relevant data source(s).

Figure 3A:
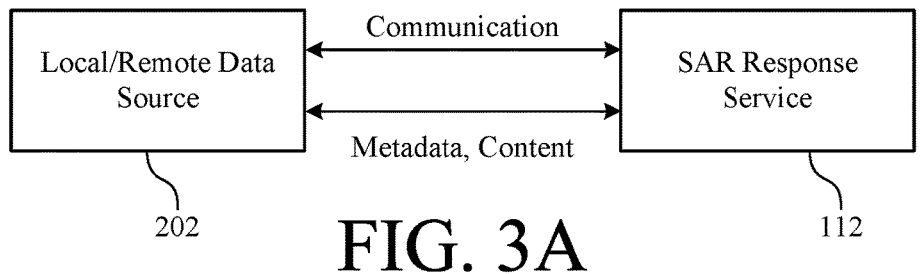
FIG. 3A is a block diagram showing content retrieval from a local/remote data source by an SAR response service.

FIG. 3A is a relational diagram showing data transfer between SAR response service 112 and a local/remote data source 202. Local/remote data source 202 is defined with respect to client site 124(1) and can be a data source stored thereon or a data source located on a remote service, such as third party storage cloud 108. In either case, data source 202 is located remotely from SAR response service 112 and communicates bi-directionally with SAR response service 112. Data source 202 also sends metadata and content to SAR response service 112. Metadata includes, but is not limited to, data representative of the file system, the file system directory, and permissions associated with file system objects on client site 124 and/or third party storage cloud 108. Content includes the data objects themselves, for example a WORD document, EXCEL file, etc., which can contain personal data. SAR response service 112 requests, receives, and processes the metadata and content in order to provide SAR response services for data source 202. Additionally, SAR response service 112 can provide metadata, content, and/or file system operations to data source 202, in the event a file or metadata needs data masking, deleted, etc.

Figure 3B:
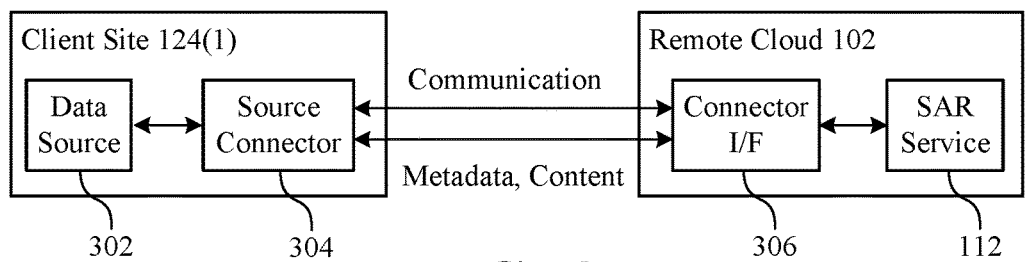
FIG. 3B is a block diagram showing content retrieval from the client site of FIG. 1 by either the remote cloud or the SAR response SaaS cloud of FIG. 1.
Figure 3C:
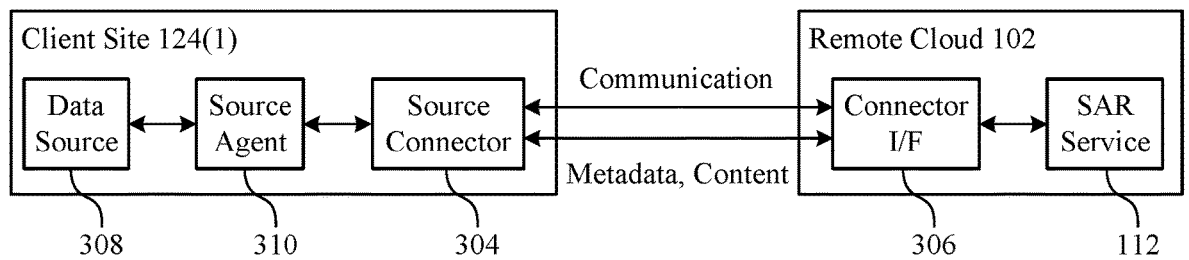
FIG. 3C is a block diagram showing content retrieval from the client site of FIG. 1 by either the remote cloud or the SAR response SaaS cloud of FIG. 1.
Figure 3D:
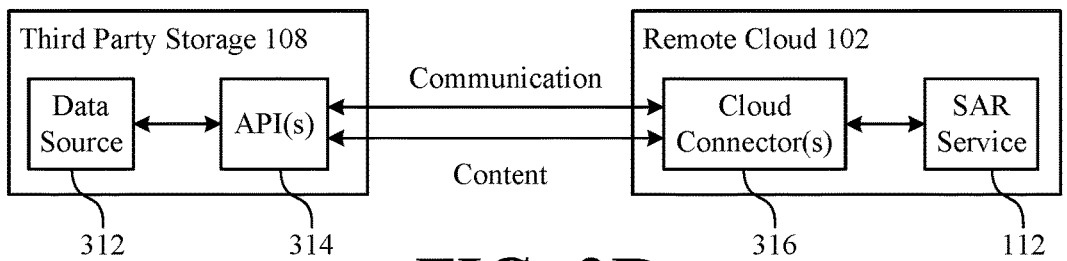
FIG. 3D is a block diagram showing content retrieval from the third party cloud provider of FIG. 1 by either the remote cloud, the SAR response SaaS cloud, or the client site of FIG. 1.

FIGS. 3B-3D are relational diagrams showing data transfer between remote cloud 102 (including SAR response service 112) and various data sources, each shown in a separate example system.

FIG. 3B shows an example data source 302, hosted on client site 124(1) in communication with a source connector 304. Source connector 304 provides/receives metadata and content directly to/from data source 302. Source connector 304 maintains an Internet connection with a connector interface 306 on remote cloud 102 and sends the metadata and content from data source 302 to connector interface 306 via the connection. Source connector 304 also receives content and metadata from SAR service 112 via this connection. Source connector 304 and connector interface 306 each include specific networking protocols for communicating with one another over the Internet. Connector interface 306 forwards the data (e.g., metadata and/or content) received from source connector 304 to SAR service 112 and forwards the data from SAR service 112 to source connector 304.

FIG. 3C shows an example data source 308 hosted on client site 124(1). Data source 308 is substantially similar to data source 302, except data source 308 and source connector 304 cannot directly communicate with one another, at least for some data types. Therefore, a source agent 310 is also hosted on client site 124(1). Source agent 310 is a software module that provides an interface between data source 308 and source connector 304. For example, a source agent might be required to access a certain type of file system object (e.g., a proprietary spreadsheet, a proprietary word processing document, graphics files, and so on). Although source agent 310 is shown separately from data source 308, source agent 310 could be installed directly onto data source 308. Source connector 304, connector interface 306, and SAR service 112 function as described with respect to FIG. 3B.

FIG. 3D shows an example data source 312 hosted on third party storage cloud 108. Data source 312 utilizes one or more APIs 314 to facilitate communication with its clients via internetwork 110. Cloud connectors 316 utilize APIs 314 to facilitate communication between remote cloud 102 and third party storage cloud 108. APIs 314 can include publicly available protocols for communicating with remote services over the Internet. Cloud connectors 316 utilize APIs 314 to retrieve metadata and content from storage server 108 for remote cloud 102, as well as provide metadata, content, and, in some embodiments, control messages to storage server 108. Cloud connectors 316 forward metadata and content received via APIs 314 onto SAR response service 112 and provide metadata, content, and messages to APIs 314 on behalf of SAR service 112.

It is important to note that, although the data communicated in FIGS. 2-3D is explicitly shown to include only metadata and content, remote cloud 102 can retrieve any other conceivable data type from client site 124(1) and/or third party storage cloud 108. For example, remote cloud 102 can retrieve events indicative of changes made to the file system(s) hosted by client site 124(1) and/or third party storage cloud 108. The events could quickly and efficiently provide information to SAR response service 112 regarding files containing personal data that were moved, added, and/or deleted. Such information would allow SAR response service 112 to efficiently respond to changes to personal data, even while processing and responding to SARs corresponding to that personal data.

Additionally, SAR response service 112 is not dependent on any of the particular communication methods shown in FIGS. 3A-3D. While the described embodiments do provide advantages through the timely, efficient, and targeted collection of important content and metadata from data source 202, SAR response service 112 is capable of serving SAR requests with alternative data transfer techniques, including those yet to be invented.

Figure 4:
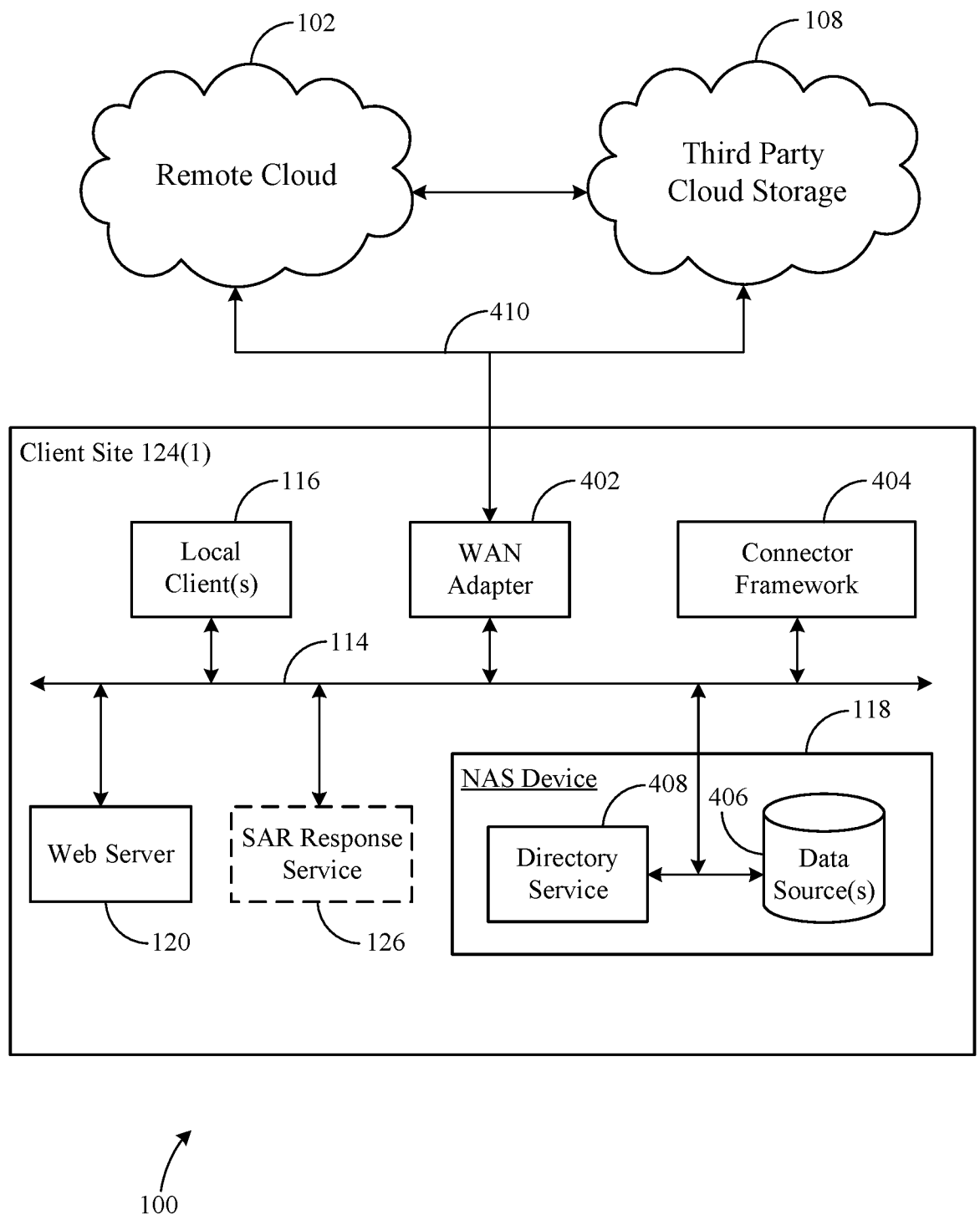
FIG. 4 is a block diagram showing the client site of FIG. 1 in greater detail.

FIG. 4 is a block diagram showing communication between various components of cloud computing system 100, including client site 124(1), which is shown in greater detail. Client site 124(1) includes local clients 116, NAS device 118, a WAN adapter 402, a connector framework 404, web server 120, and (optionally) SAR response service 126, all interconnected via local network 114. NAS devices 118 include one or more storage devices connected to local network 114 and accessible by other components connected to local network 114. NAS devices 118 host data source(s) 406, and a directory service 408 runs on a separate, dedicated server. Data sources 406 include file system objects (e.g. files, metadata, applications, etc.) constituting a local file system that can be accessed by local clients 116, connector framework 404, and web server 120 for storage, viewing, editing, utilization, etc. Directory service 408 includes user permissions and lookup tables to allow local clients 120 with sufficient credentials to locate and access available data objects included in data sources 406. WAN adapter 402 is a network device that provides a connection 410 to a wide-area network, which, in this example, is the Internet (omitted from FIG. 4 for clarity). Components connected to local network 114 can access remote cloud 102 and third party storage cloud 108 via an Internet connection 410 provided by WAN adapter 402. Local clients 116 can utilize Internet connection 410 to upload and/or download data objects from third party storage cloud 108.

Connector framework 404 hosts a software-based framework of source connectors (such as source connector 304). In the example embodiment, connector framework 404 is a server hosting virtualization software for running virtual machines to host various source-specific modules. The connector framework 404 orchestrates files to be processed by a content and metadata extraction service, in order to provide content and metadata that is particularly useful for SAR response service 112 through WAN adapter 402. Connector framework 404 can include services such as a person-identifier service to locate references to people within data objects and a personal-data service to identify sensitive personal data within data objects. One or more of these services can also be hosted on remote cloud 102 or both remote cloud 102 and connector framework 404. More information regarding connector frameworks can be found in the above-cited U.S. patent application Ser. No. 15/487,947, entitled Hybrid Approach to Data Governance, filed Apr. 14, 2017 by Jassal et al.

Web server 120 is a server device that hosts the required hardware, software, and/or firmware required to provide online customers 122 with web services, such as a website or e-commerce portal. In this example embodiment, web server 120 hosts a web server program, such as APACHE®, that utilizes the hypertext transfer protocol (HTTP) to receive customer requests and data and to provide data and services in response to the requests. However, web server 120 could utilize any available web server program and/or protocol for communicating with online customers. Web server 120 can also include one or more storage devices for storing customer data. Connector framework 404 utilizes a source connector specifically adapted for gathering personal data from the storage devices of web server 120 and providing that personal data to remote cloud 102. Additionally, web server 120 is adapted to receive SARs from online customers (e.g. through email, customer service programs, etc.) and forward these requests, either directly or via connector framework 404, to remote cloud 102 for further processing.

Figure 5:
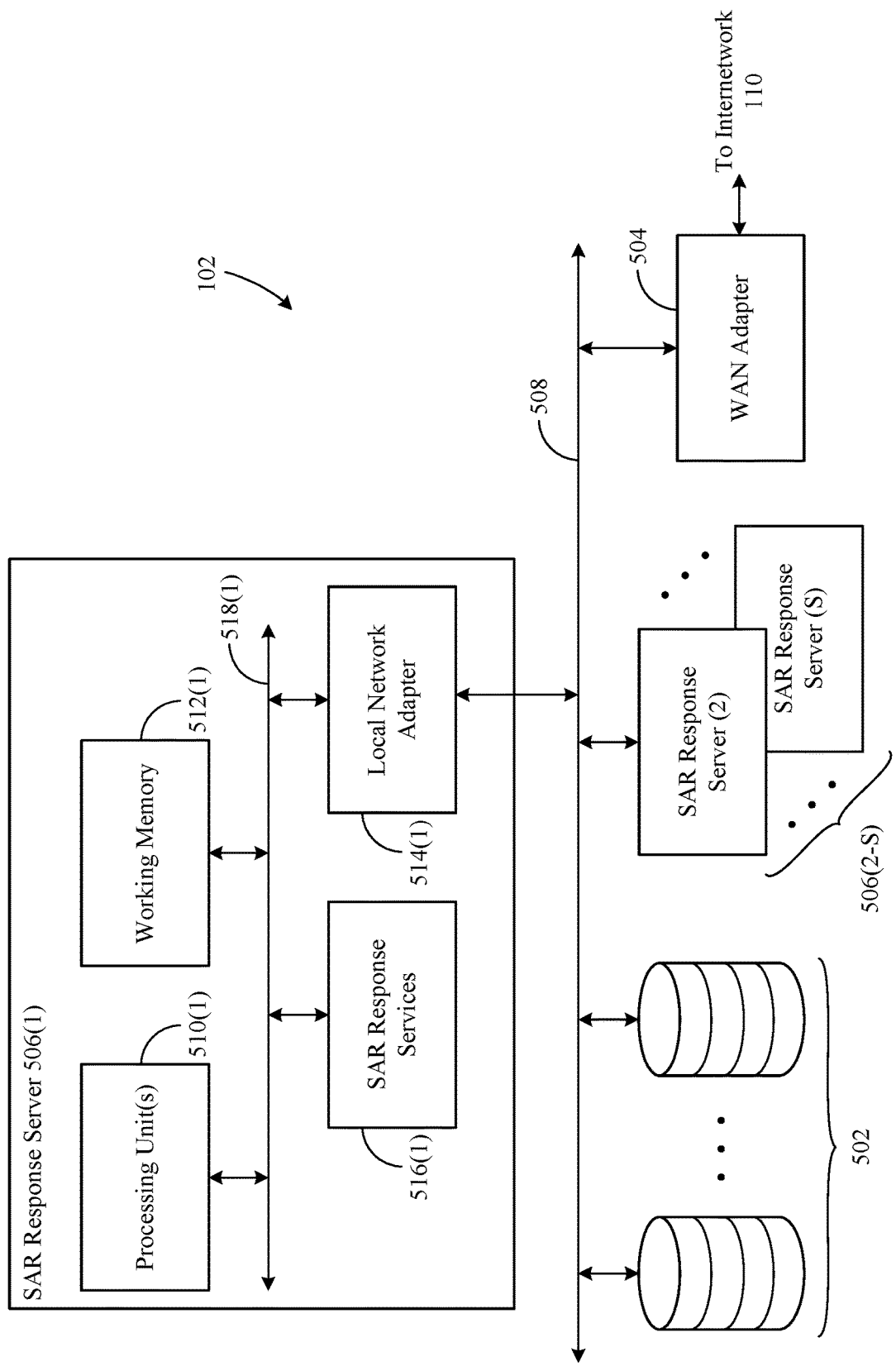
FIG. 5 is a block diagram showing the remote cloud of FIG. 1 in greater detail.

FIG. 5 is a block diagram showing an example architecture of remote cloud 102. Remote cloud 102 is a cloud-based computer system including multi-tenant data storage devices 502, a WAN adapter 504, and SAR response servers 506(1-S), all interconnected via a local network 508. Storage devices 502 are network attached storage devices for storing data associated with multiple different cloud clients. Storage devices 502 can provide non-volatile data storage for use by the other components of remote cloud 102, as well. WAN adapter 504 is a network adapter for establishing a connection to internetwork 110. Elements of remote cloud 102 utilize WAN adapter 504 to communicate with remote systems, such as local cloud 104, SAR response SaaS cloud 106, and third party storage cloud 108.

SAR response servers 506 provide SAR response services for cloud customers associated with remote cloud 102. In the example embodiment, SAR response server 506(1) provides SAR response services for client site 124(1), as well as additional client data stored on third party storage cloud 108. SAR response server 506(1) includes one or more processing units 510(1), working memory 512(1), a local network adapter 514(1), and a SAR response services module 516(1), all interconnected via an internal bus 518(1). Processing unit(s) 510(1) are, for example, one or more hardware processors, microprocessors, and/or microchips that execute code transferred into working memory 512(1) from, for example, storage devices 502 to impart functionality to various components of data governance server 506(1). This code includes a set of predefined instructions that cause processing unit(s) 510(1) to perform a corresponding set of operations in response to executing the code. The various functions of data governance server 506(1) (including SAR response services module 516(1)) are achieved by executing various subsets of the predefined instructions, the subsets being configured to cause processing unit(s) 510(1) to carry out the intended functionality. Working memory 512(1) includes, for example, random access memory that can also cache frequently used code, such as network locations of storage devices 502, to be quickly accessed by the various components of SAR response server 506(1). Local network adapter 514(1) provides a network connection between SAR response server 506(1) and local network 508 and, therefore, WAN adapter 504, which provides a connection to internetwork 110. SAR response services 516(1) include various hardware, software, and/or firmware services, operating within or in conjunction with working memory 512(1), for collecting and analyzing data and metadata that is retrieved from storage devices 502, connector framework 404, and/or web server 120. SAR response services 516(1) provide the functionality required to receive, process, and serve SARs. Although only SAR response server 506(1) is shown in detail, it should be understood that SAR response server 506(1) is substantially similar to SAR response servers 506(2-S), except that any of SAR response servers 506 can correspond to different cloud clients and, therefore, can be configured differently to utilize different data, connectors, applications, network connections, etc. The functionality of SAR response services module 516(1) are shown in greater detail below, with reference to FIGS. 6-12.

Figure 6:
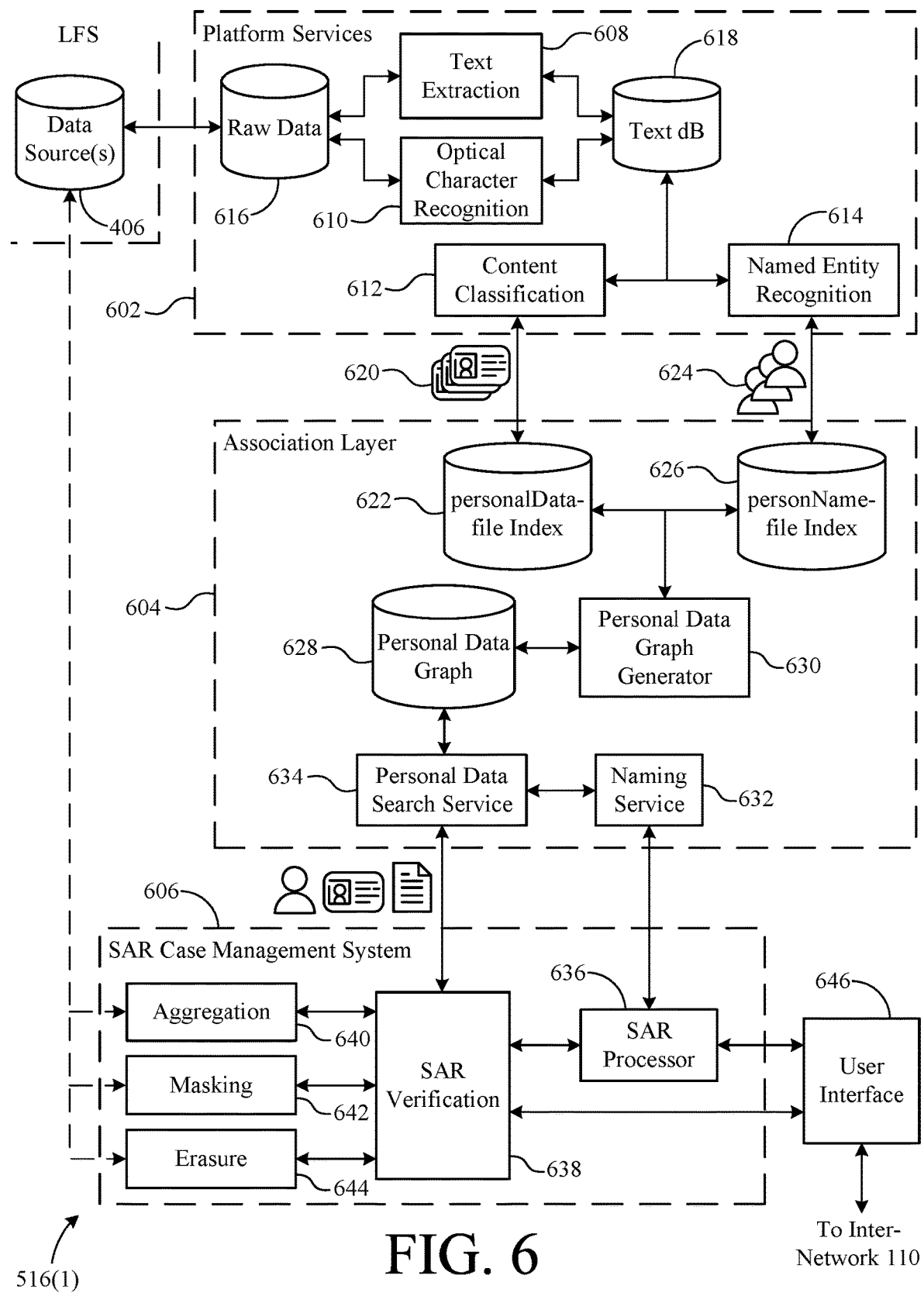
FIG. 6 is a data flow diagram illustrating a method for generating a personal data graph from file content and utilizing the personal data graph to respond to SARs.

FIG. 6 is a block diagram showing elements of SAR response services module 516(1) in greater detail. The elements shown in FIG. 6 are configured to process data in response to or anticipation of receiving an SAR. A platform services layer 602 includes services for collecting file content, extracting important data from the content, and providing the extracted data to an association layer 604. Association layer 604 generates associations between people (or juristic entities) and their personal data that is found in data files. Association layer 604 provides the associations to a SAR case management system 606, which process SARs and generates appropriate responses, based on the type of SAR. SAR case management system 606 provides the responses to the requesting users via internetwork 110.

Platform services layer 602 includes a text extraction service 608, an optical character recognition service 610, a content classification service 612, and a named entity recognition (NER) service 614. Files and metadata retrieved from data sources 406 are stored in a raw data database 616 for processing by the various services of platform services layer 602. Text extraction service 608 processes data stored in database 616 to generate textual representations (e.g., machine-encoded text) of the content contained therein. Similarly, optical character recognition service 610 analyses image data stored in database 616 to extract text embedded in those images. Both text extraction service 608 and optical character recognition service 610 include a post-processing phase to correct a priori, known errors. In the example embodiment, the post-processing phase is implemented with language dictionaries, and incorrect text is corrected to the closest matching valid text found in the dictionaries (e.g. "passpor1" is corrected to "passport"). The extracted text is stored in a text database 618, where it is readily accessed and analyzed by content classification service 612 and NER service 614.

Content classification service 612 utilizes various techniques for identifying machine-learned patterns and regular expressions that are likely to correspond to personal data, such as credit card numbers, passport numbers, social security numbers, or other unique identifiers. Content classification service 612 utilizes one or more of the following techniques.

First, extracted text is scanned to identify qualifying tokens, such as "passport number", "credit card number", "SSN", etc. These qualifying tokens indicate the presence of personal data elsewhere in the document. When a qualifying token is identified, some identifying data regarding the token is stored. This data may include the length of the token, the type of token, the exact text of the token, the position of the token within the text, etc. This data is later utilized to verify identified instances of personal data within the text.

Next, extracted text is scanned to identify machine learned patterns and/or regular expressions indicative of personal data. For example, the regular expression "^4[0-9]{12}" defines a pattern for 13 numbers starting with the number "4" (i.e., a pattern for old VISA credit card numbers). Similar to tokens, some identifying data regarding these patterns are stored. Such data may include the length of the pattern, the type of the pattern, the exact text of the pattern, the position of the pattern within the text, etc. This data is also utilized to verify identified instances of personal data within the text.

Finally, identified patterns are linked with corresponding identified tokens. For example, an identified regular expression corresponding to a passport number would be linked to the token "Passport Number". It should be noted that a pattern can be linked with a plurality of tokens. For example, a pattern corresponding to a credit card number can be linked with the tokens "CCN", "Credit Card #", "credit card no.", etc. Optionally, linked patterns and tokens can be verified by measuring the character distance (i.e. number of text characters) between them in the extracted text. Patterns and tokens would then only be verified if the character distance is less than a predetermined threshold. Additional non-limiting examples of verification include considering the positions of other patterns and tokens within the text or by considering known formatting conventions of documents likely to contain sensitive personal data.

Content classification service 612 also utilizes validation techniques to limit false positives. In the example embodiment, checksum computation is utilized, but any relevant validation technique can be used. Once the identified patterns and tokens are linked and validated, content classification service 610 then saves identified personal data 620 in a personalData-File index 622. Index 622 is accessible to components of association layer 604, which provide additional functionality for creating associations between personal data 620 and person names 624 identified by NER service 614.

NER service 614 utilizes a natural language processing technique that recognizes references to people within text content 616. NER service 614 locates and classifies named entities in the text data into person names 624, which can then be stored in a personName-file index 626 accessible to components of association layer 604. Multilingual models are used for content with multiple languages, and lists of public organizations are used to eliminate misclassification of organization entities as person names.

NER service 614 utilizes batches of files, each including N documents. Each document is also split into m chunks, which are defined by the source file f, the start index of the chunk $c_m$ (where m identifies the chunk, 0 being the first chunk), and a length of the chunk $l_m$. The maximum number of characters in a chunk is a parameter of the system denoted $max_m$, where $l_m \leq max_m$. The chunks are also configured to overlap by some constant amount of characters, which prevents names from being undetected should they be located at or near the start/end of a chunk.

Each chunk is then scanned for person names, which, when identified, are saved along with the start and end indexes, data identifying the source chunk, and data identifying the source file. The extraction of person names from each chunk consists of returning a list of triplets:

<person name, start_index, end_index>, where, for each triplet, person name is a string of characters representing a named entity and occurring in the chunk between the start_index and the end_index. This data is then used to consolidate the resultant list of person names and eliminate duplicate names found in overlapping portions of adjacent chunks. This process is summarized in the following example pseudocode.

```
if personName-file.index = null
    create(personName-file.index)
get(next_batch)
    for each file, f, in batch
        max_m = 10240
        overlap = 1024
        generate chunks(f, c = m(max_m - overlap), l_m ≤ max_m)
        for each chunk, m, in file
            extract person names
            for each person name
                store person name
                store start index
                store end index
        merge person names and indexes from each chunk
        eliminate duplicated person names from adjacent chunks
        for each person name
            modify(personName-file.index,
                add_file,
                add_name,
                add_index(start_index, end_index) )
```

In the example embodiment, this process is performed by a name entity recognition model provided, for example, by the SpaCy library and trained to recognize person names. The process could also be performed by other models, including those now known or yet to be invented. The example model has been trained on publicly available files from the "Enron Corpus". For training purposes, the files from the corpus were split into chunks with a maximum of 600 words. Each chunk was manually annotated for person names. In other words, a human read each chunk and provided the indexes of the first and last character of each person name. For example, the chunk "riday night. Jeff Skilling and Greg Whalley have taken time out of their schedule to" would be annotated to show ("Jeff Skilling", [13, 25]) and ("Greg Whalley", [31, 42]). The model was trained on 6000 similar chunks.

NER service 614 provides several advantages. First, NER service 614 provides an indexed database linking names with associated documents. This database can be queried to determine if a given entity has been mentioned in any of the documents and only needs to be indexed once. This query can be performed without requiring a full search of the documents. Additionally, NER service 614 does not require a priori knowledge of all possible names in a set of files in order to determine the entities named in the set of files. Finally, eliminating reliance on fixed lists of names (e.g. the U.S. census) allows NER service 614 to identifying new names.

It should be noted that the components of platform services layer 602 can be altered or even omitted entirely in alternate embodiments of the present invention. For example, in alternate embodiments content classification service 612 and NER service 614 can be adapted to identify personal data and names in the native file data itself, rather than the text content. In such embodiments, the textual representations of the personal data and names could then be generated, as needed, from the identified native file data.

Association layer 604 includes personalData-File index 622, personName-File index 626, a personal data graph 628, a personal data graph generator 630, a naming service 632, and a personal data search service 634. Personal data graph 628 is a database storing data indicative of relationships between files, person names, and personal data. In particular, personal data graph 628 includes a tripartite, undirected multigraph that consists of nodes and edges indicative of a plurality of associations between names, pieces of personal data, and files in which they (names and personal data) are found together. These associations indicate where in the file the name and the personal data are found, as well as how far apart the locations of the name and personal data are in the file. For names and personal data found multiple times in the same file, there will be additional associations for each combination of the names and personal data. Personal data graph 628 will be described in greater detail with reference to FIGS. 9 and 10, below.

Personal data graph generator 630 utilizes the information stored in personalData-file index 622 and personName-file index 626 to create personal data graph 628. Personal data graph generator 630 saves personal data and person names from indexes 622 and 626, as well as the files that the names and personal data are found in, as nodes of personal data graph 628. These nodes are connected by edges, which are undirected. Personal data graph 628 is tripartite, meaning that no node can be joined to another node of the same type (i.e. no edge joins two files, two names, or two pieces of personal data). Personal data graph generator 630 uses the stored locations of the personal data and person names in indexes 622 and 626 to create these edges. The edges between a file and a name or a piece of personal data include a vector indicative of where the name or personal data is located within the file, and, for names or pieces of personal data that appear multiple times in the same file, multiple edges are generated. The edges between names and personal data are indicative of a common file, as well as the distance between the person name and the personal data in the common file. This distance is indicative of how likely the piece of personal data belongs to the person identified by the name.

Naming service 632 generates as many variants of a person's name as possible. Naming service 632 receives a name from SAR case management system 606 responsive to an SAR being received. Naming service 632 generates the variants and provides them to personal data search service 634 to facilitate an exhaustive search of personal data graph 628 for personal data that might correspond to the person originating the SAR. To this end, naming service 632 employs four main approaches to generate variants. These approaches consist of the following: permutations of first names, last names, and, optionally, initials; case conversion (e.g. "WILLIAM" is a variant of "William"); truncation or removal of middle names; and substitution with nicknames or abbreviations (e.g. "Will" and "Bill" are variants of "William"). Naming service 632 allows personal data search service 634 to search for all the variants of an individual's name without having these names listed in the SAR.

Personal data search service 634 responds to SARs utilizing personal data graph 628. In order to serve each type of SAR, it is useful for personal data search service 634 to support six different request/types.

Personal data search service 634 can determine in which file a given person name occurs by querying the edges <file, person name> on personal data graph 628. This query can be utilized to answer requests related to data portability and the right to be forgotten. It is useful to know in which files a name is mentioned, in order to provide those files or to remove data from them.

Personal data search service 634 can also determine which names are mentioned in a given file by querying the edges <file, person name> on personal data graph 628. This query can be utilized to answer requests related to data portability, and to determine whether there are names other than the requester. Personal data and names of other users should be removed from the files before they are provided in response to the SAR.

In addition, personal data search service 634 can determine in which files a given piece of personal data occurs by querying the edges <file, personal data> on personal data graph 628. This query can be utilized to answer requests related to data portability and the right to be forgotten. It is useful to know in which files a piece of personal data is mentioned, in order to handle those files or to remove data from them.

Personal data search service 634 can also determine what personal data is mentioned in a given file by querying the edges <file, personal data> on personal data graph 628. This query can be utilized to answer requests related to data portability and the right to be forgotten. It is useful to know whether a piece of personal data is mentioned in a file, in order to determine whether to provide the file or to remove data from the file.

Moreover, personal data search service 634 can determine what personal data is associated with a person name by querying the edges <person name, personal data> on personal data graph 628. This query can be utilized to answer requests related to the right to be informed. It is useful to know what personal data is associated with a given person name in order to inform a requesting user of their personal data stored in the system.

Personal data search service 634 can also determine which person name is associated with a piece of personal data by querying the edges <person name, personal data> on personal data graph 628. This query can utilized to answer requests related to the right to be informed. It is useful to know what names are associated with a given piece of personal data in order to perform an exhaustive search related to those names.

Personal data search service 634 provides the results of these queries to SAR case management system 606 upon completion of the search/queries. The results are provided as pieces of personal information and the files contained in them, as well as any variants of the subject's name and the files in which the variants are mentioned. In most circumstances, the information provided to SAR case management system 606 is sufficient to fully serve the corresponding SAR.

SAR case management system 606 includes an SAR processor 636, an SAR verification module 638, an aggregation service 640, a masking service 642, and an erasure service 644. SAR processor 636 receives SARs via a user interface 646 electrically coupled to communicate with internetwork 110. Responsive to receiving an SAR corresponding with a particular subject, SAR processor 636 determines the type of request (e.g., "right to be notified", "right for data portability", and "right to be forgotten"), the name of the subject, and any provided personal data to naming service 632 to facilitate the personal data search.

SAR verification module 638 provides the determined information to personal data search service 634, receives the results of the personal data search from personal data search service 634, and verifies the results with the user who originated the SAR. In particular, SAR verification module 638 communicates with a user via user interface 646 and the Internet, presenting the pieces of personal information most likely to correspond to the subject of the SAR. The communication allows the user to select the pieces of personal information that correspond to the subject of the request. Upon receiving verification of the results of the search, SAR verification module 638 processes the results, as well as information received with the original SAR (received from SAR processor 636), to determine how to proceed in order to properly serve the SAR.

In the case of a "right to be informed" request, SAR verification module 638 compiles a summary of the individual's personal content that is stored in data source(s) 406. This summary includes, for example, a list of files identified in the personal data search along with the personal data items that are mentioned in those files. SAR verification module 638 then provides the summary to the user via user interface 646, thereby serving the SAR.

In the case of a "right for data portability" request, the system should ensure that personal content of others is not exposed accidentally. In this case, SAR verification module 638 compiles the same summary of personal content, but provides the list of files in the summary to aggregation service 640. Aggregation service 640 retrieves the files on the list from data source(s) 406 and provides them to SAR verification module 638. Additionally, SAR verification module 638 queries personal data search service 634 to identify any personal data corresponding to other individuals that may be present in the listed files. Any files containing personal data having a negative association with the subject of the request (e.g. names or personal data corresponding to other entities) are provided to masking service 642, which performs a permanent redaction on the co-mingled personal data of others. This permanent redaction utilizes file-type specific redaction technologies and ensures that sensitive data belonging to others cannot be accessed by anyone at a later time. Finally, the redacted files are provided for download to the requesting user via, for example, a secure download link. Provision of the redacted files constitutes service of the SAR.

In the case of a "right to be forgotten" request, the system should ensure that the personal content of other individuals is not deleted accidentally. SAR verification module 638 again compiles the summary of personal content. In this case, however, there is no need to perform an additional query on personal data graph 628, because the personal data of the subject is redacted rather than the personal data of others that exists in the same files. Instead, SAR verification module 638 provides the list of files and personal data to one or both of masking service 642 and erasure service 644. Masking service 642 performs redaction of personal data corresponding to the subject of the request within files having co-mingled personal data of others. Masking service 642 then replaces the original files in data source(s) 406 with these redacted files and, optionally, archives the original files to a secure location for backup and recovery purposes. Erasure service 644 erases files that do not contain co-mingled personal data of others. Erasure service 644 can delete these files permanently in order to serve the SAR fully.

The systems, procedures, data, and modules shown in FIG. 6 and described with reference thereto are explanatory in nature. Many alterations, substitutions, and/or omissions are possible without departing from the scope of the present invention. For example, the exact structure and/or content of the data in personal data graph 628 could be altered. As another example, erasure service 644 could be omitted with personal data being redacted only, even in the case of files having no co-mingled personal data. These and other deviations from the example embodiment will be apparent to those of ordinary skill in the art.

Figure 7:
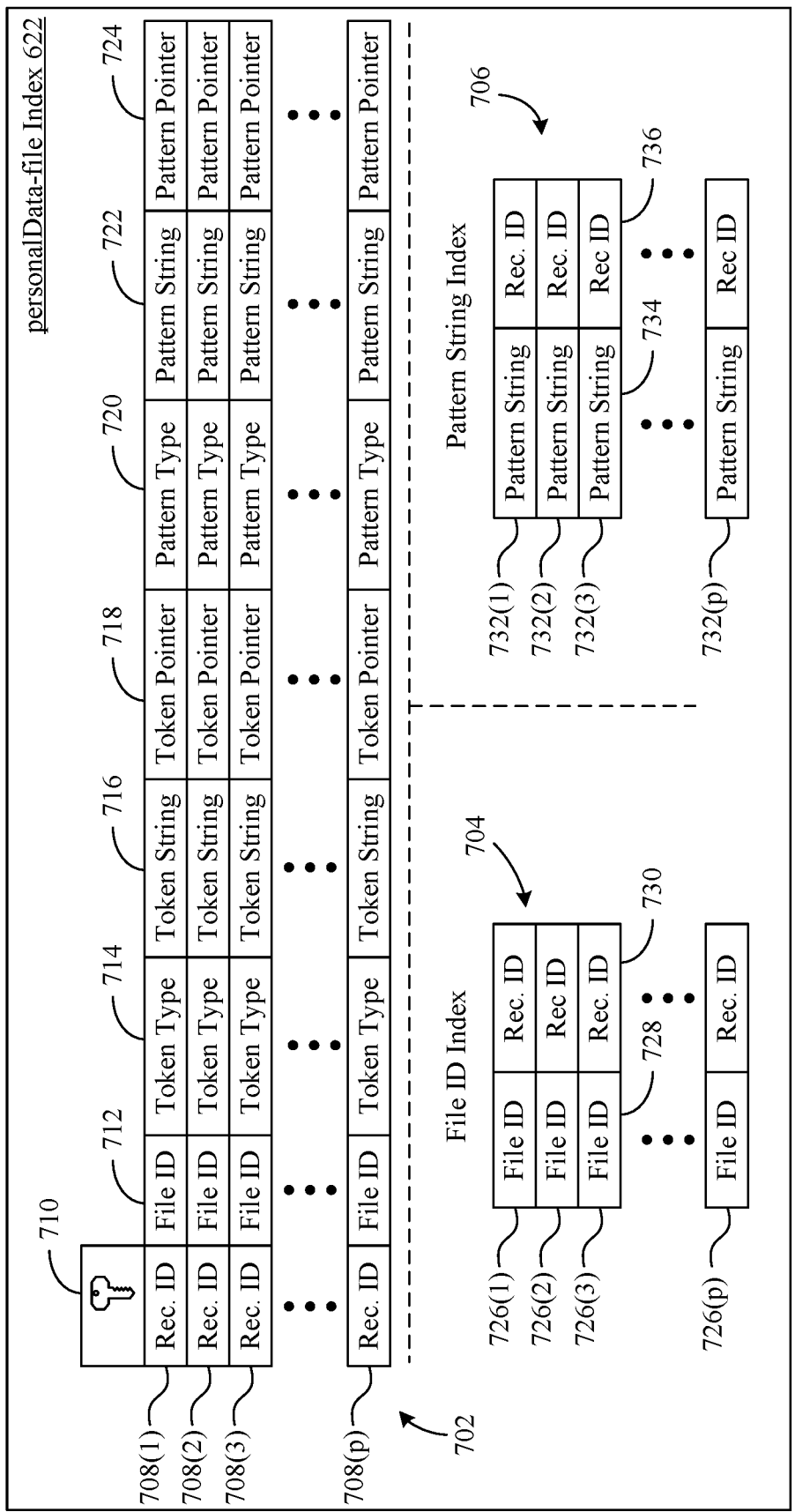
FIG. 7 is a diagram illustrating an example data structure of the personalData-File index of FIG. 6.

FIG. 7 is a diagram illustrating a particular example data structure 700 for data stored in personalData-file index 622. Data structure 700 includes a data table 702, a file ID index 704, and a pattern string index 706. Data table 702 includes a plurality of records 708(1-$p$), each including a record ID field 710, a file ID field 712, a token type field 714, a token string field 716, a token pointer field 718, a pattern type field 720, a pattern string field 722, and a pattern pointer field 724. Each of records 708 corresponds to a qualified token-pattern match and includes information indicative of the match. Record ID field 710 includes a record identifier uniquely identifying each of records 708. Thus, record ID field 710 is the key field of data table 702. File ID field 712 includes an identifier (e.g., the name and pathway of the file) corresponding to the particular file stored on data source(s) 406 in which the match was found. Token type field 714 includes data indicative of the type of token (e.g., corresponding to a passport number, a credit card number, etc.) found as part of the match. Token string field 716 includes the data (e.g., characters, numbers, symbols, etc.) comprising the token, as it appears in the text of the particular file. Token pointer field 718 includes data indicating the location of the token within the particular file. Pattern type field 720 includes data indicative of the type of pattern found as part of the match. In each of records 708, token type field 714 and pattern type field 720 should match. If they do not match, record 708 includes erroneous data. Pattern string field 722 includes the data corresponding to the pattern, as it appears in the text of the particular file. Pattern pointer field 724 includes data indicating the location of the pattern within the particular file. It should be noted that each of fields 712-724 may include duplicate data between a given pair of records 708, as some tokens/patterns may appear multiple times within the same file or across multiple files.

File ID index 704 is an index of file ID field 712 for all of records 708. File ID index 704 includes a plurality of records 726(1-$p$), each including a file ID field 728 and a record ID field 730. Each of records 726 corresponds to one of records 708, but are organized by file ID (e.g., in alphanumeric order). This allows the system to efficiently query the data in table 702, for example, by utilizing binary tree searching to locate all of records 726 corresponding to a given file. Then each of the located records 726 can be utilized to locate all of the corresponding records 708, in order to find all of the data in table 702 that is associated with a given file. Indexing by file ID field 728 allows the system to quickly search for all of the personal data that appears within a given file.

Pattern string index 706 is an index of pattern string field 722 for all of records 708. Pattern string index 706 includes a plurality of records 732(1-$p$), each including a pattern string field 734 and a record ID field 736. Each of records 732 corresponds to one of records 708, but are organized by pattern string (e.g., in alphanumeric order). This allows the system to efficiently query the data in table 702, for example, by utilizing binary tree searching to locate all of records 732 corresponding to a given piece of personally identifiable information (PII). Then each of the located records 732 can be utilized to locate all of the corresponding records 708, in order to find all of the data in table 702 that is associated with the given PII. Indexing by pattern string field 734 allows the system to quickly search for all of the files that a given PII appears in.

Figure 8:
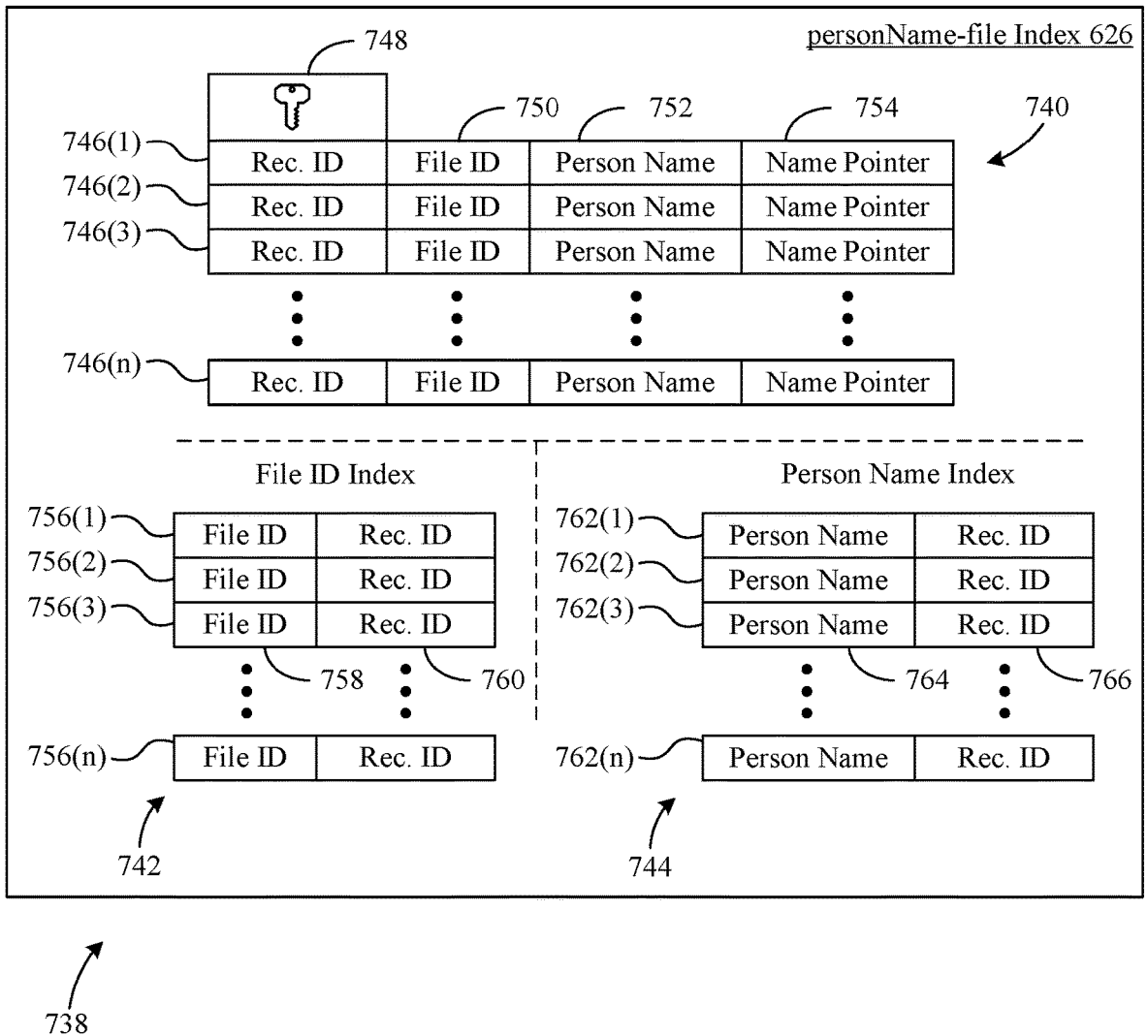
FIG. 8 is a diagram illustrating an example data structure of the personName-File index of FIG. 6.

FIG. 8 is a diagram illustrating a particular data structure 738 for data stored in personName-file index 626. Data structure 738 includes a data table 740, a file ID index 742, and a person name index 744. Data table 740 includes a plurality of records 746(1-n), each including a record ID field 748, a file ID field 750, a person name field 752, and a name pointer field 754. Each of records 746 corresponds to an identified instance of a person name identified in data source(s) 406 and includes information associated with the name. Record ID field 748 includes a record identifier uniquely identifying each of records 746. Thus, record ID field 748 is the key field of data table 740. File ID field 750 includes an identifier (e.g., the name and pathway of the file) corresponding to the particular file stored on data source(s) 406 in which the name was identified. Person name field 752 includes the name itself, as it appears in the text of the particular file. Name pointer field 754 includes data indicating the location of the name within the particular file. It should be noted that each of fields 748, 750, 752, and 754 may include duplicate data between a given pair of records 746, as some names may appear multiple times within the same file or across multiple files.

File ID index 742 is an index of file ID field 750 for all of records 746. File ID index 742 includes a plurality of records 756(1-n), each including a file ID field 758 and a record ID field 760. Each of records 756 corresponds to one of records 746, but are organized by file ID (e.g., in alphanumeric order). This allows the system to efficiently query the data in table 746, for example, by utilizing binary tree searching to locate all of records 756 corresponding to a given file. Then each of the located records 756 can be utilized to locate all of the corresponding records 746, in order to find all of the data in table 740 that is associated with a given file. Indexing by file ID field 758 allows the system to quickly search for all of the names that appear within a given file.

Person name index 744 is an index of person name field 752 for all of records 746. Person name index 744 includes a plurality of records 762(1-n), each including a person name field 764 and a record ID field 766. Each of records 762 corresponds to one of records 746, but are organized by person name (e.g., in alphabetic order). This allows the system to efficiently query the data in table 740, for example, by utilizing binary tree searching to locate all of records 762 corresponding to a given name. Then each of the located records 762 can be utilized to locate all of the corresponding records 746, in order to find all of the data in table 740 that is associated with the given name. Indexing by person name field 764 allows the system to quickly search for all of the files that a given name appears in.

Figure 9:
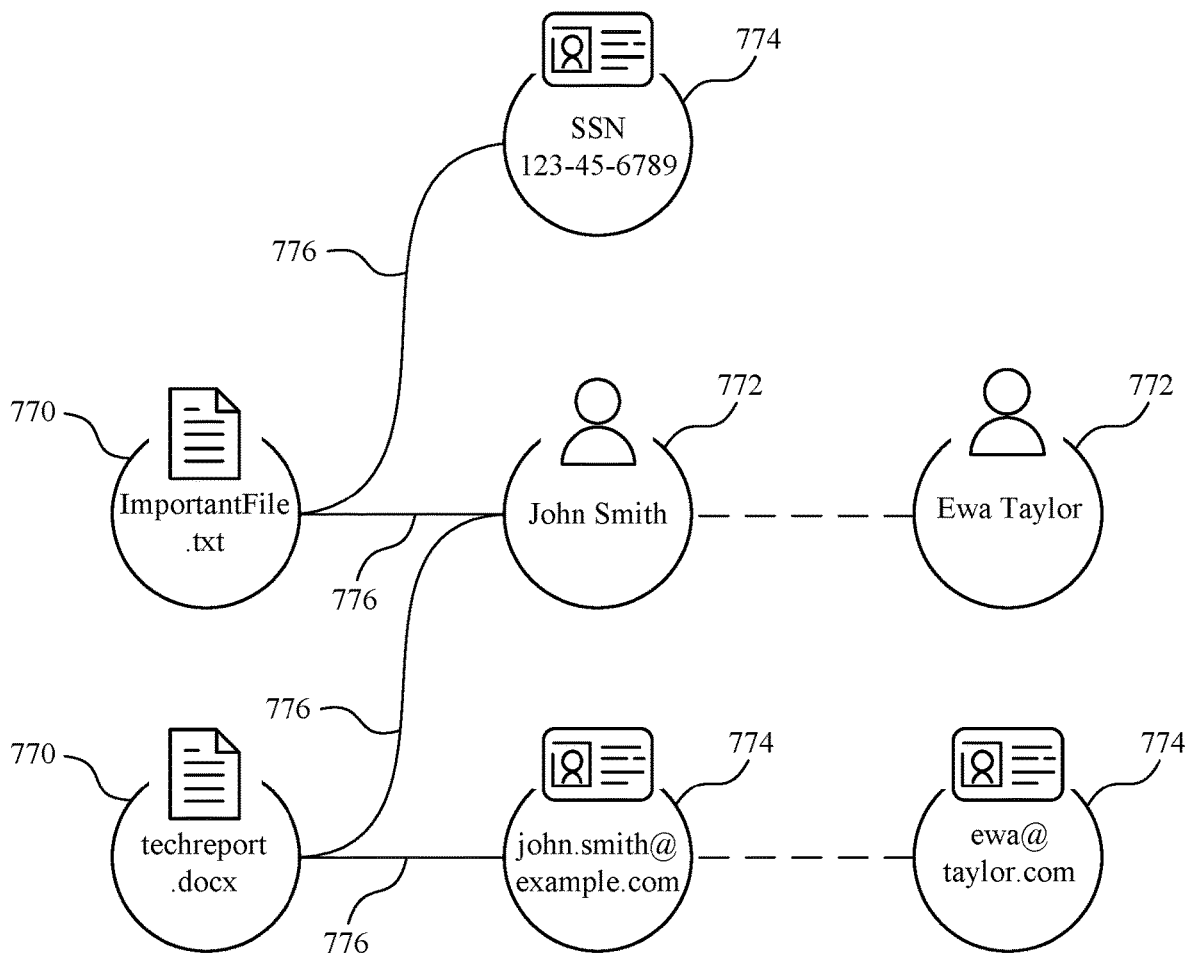
FIG. 9 is a diagram illustrating certain aspects of the personal data graph of FIG. 6.

FIG. 9 is a diagram illustrating a particular aspect of personal data graph 628. A portion 768 of personal data graph 628 includes file nodes 770, name nodes 772, PII nodes 774, and edges 776. Personal data graph 628 is a tripartite, undirected multigraph, which contains "nodes" corresponding to names, PIIS, and files, as well as "edges" corresponding to relationships between nodes. Because personal data graph 628 is a multigraph, any two nodes can be connected by more than one edge. Indeed, if a person name appears many times in a file, multiple edges are created between the corresponding person name and file nodes. Because personal data graph 628 is undirected, the edges do not have an orientation, they simply express a relationship between nodes. Because personal data graph 628 is tripartite, there are no edges joining two names, two PIIS, or two files. This aspect of personal data graph 628 is illustrated by the broken lines between the "John Smith" and "Ewa Taylor" nodes 772 and between the "john.smith@example.com" and "ewa@tyler.com" nodes 774. Therefore, an association cannot be created between two files, two names, or two PIIS.

Figure 10:
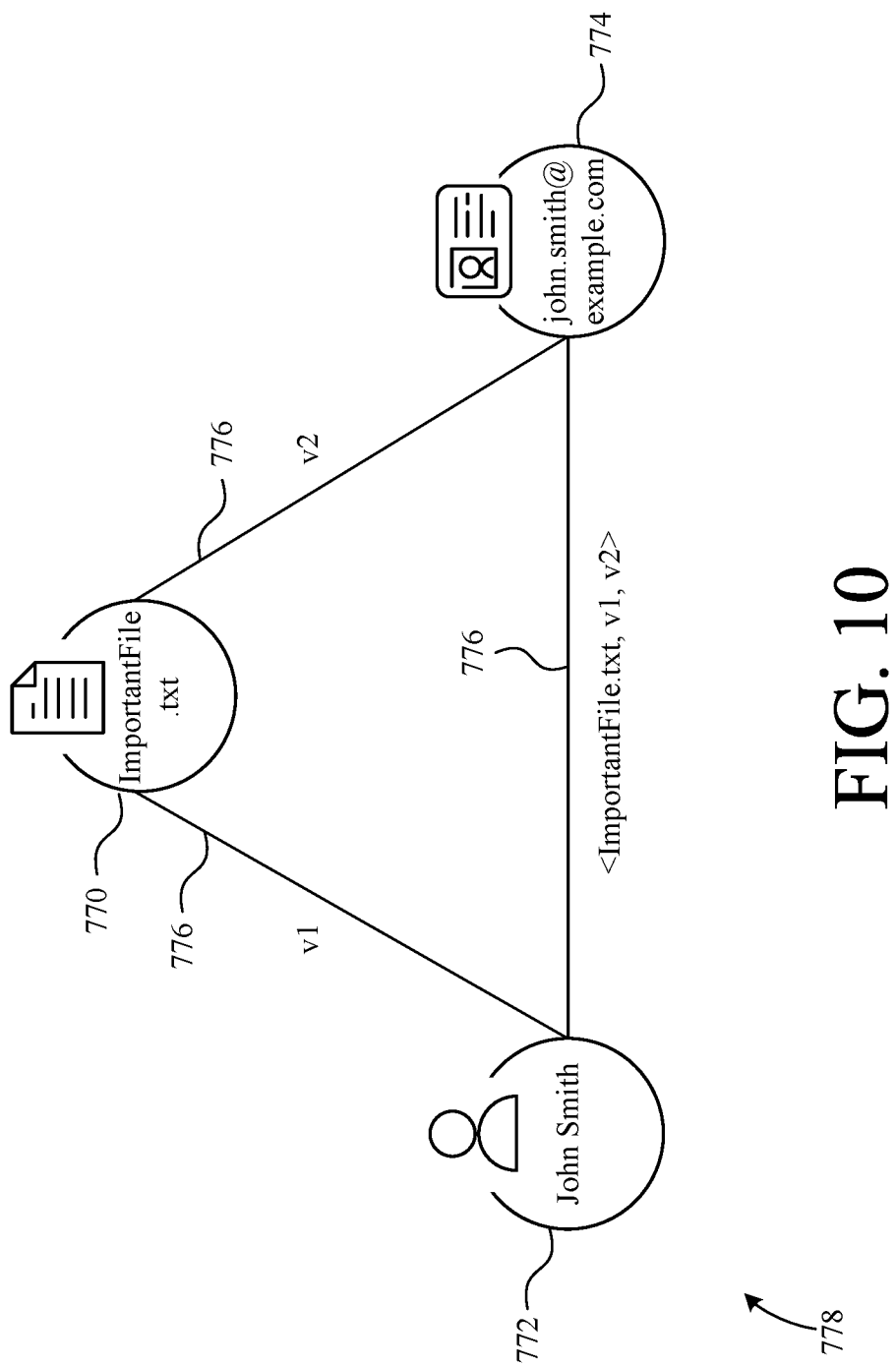
FIG. 10 is a diagram illustrating additional aspects of the personal data graph of FIG. 6.

FIG. 10 is a diagram illustrating another particular aspect of personal data graph 628. A portion 778 of personal data graph 628 includes a name node 772, labeled "John Smith", a PII node 774, labeled "john.smith@example.com", and a file node 770, labeled "ImportantFile.txt". Name node 772 is connected to file node 770 through at least one edge 776 labeled "v1" and PII node 774 is connected to file node 770 through at least one edge 776 labeled "v2". The label "v1" is indicative of a vector expressing the position of the name "John Smith" within the file "ImportantFile.txt". Similarly, the label "v2" is indicative of a vector expressing the position of "john.smith@example.com" within the file "ImportantFile.txt".

Vectors v1 and v2 have the same dimensions and can include one or more of the start offset, end offset, center offset, typed position, and/or untyped position of "John Smith" and "john.smith@example.com" within "ImportantFile.txt". The start offset is the index of the first character of the name or PII in the file, where the first character of the file is defined as index 0. Similarly, the end offset is the index of the last character of the name or PII and the center offset is the index of the middle character of the name or PII. The typed position is the position number of the name (or PII) relative to only the other names (or PIIS) in the file, where the first name (or PII) in the file is defined as position 0. In contrast, untyped position is the position number of the name (or PII) relative to both other names and other PIIS in the file, where the first name or PII in the file is defined as position 0.

Name node 772 is connected to PII node 774 through at least one edge labeled "<importantFile.txt, v1.v2>", which is indicative of the common file in which the corresponding name and PII are found in, as well as the Euclidean distance between vectors v1 and v2. The Euclidean distance between the vectors is indicative of how close together the name and PII are in the file. Because edges 776 are indicative of the likelihood that a name and PII correspond to one another (e.g., due to proximity within the file), they are utilized by personal data search service and SAR verification module 638 to service SARs accurately and efficiently.

FIG. 11 is a diagram illustrating an example user interface 800 generated by SAR verification module 638 and provided to a user originating a SAR. User interface 800 includes instructions 802, a plurality of personal data items 804, a plurality of check-boxes 806, and a confirmation button 808. In the example embodiment, user interface 800 includes a web page displayed in the user's Internet browser. Instructions 802 indicate that the user should select each piece of personal data that they are associated with. The personal data items 804 are pieces of personal data identified by personal data search service 634 as likely to be associated with the user. Personal data items 804 are masked in the case that they correspond to someone other than the user. Thus, personal data corresponding to others will not be disseminated during the verification process. The user provides input indicative of the selection of check-boxes 806 to indicate which of personal data items 804 they are associated with, before selecting the confirmation button 808 to provide the selected data items back to SAR verification module 638.

Figure 12:
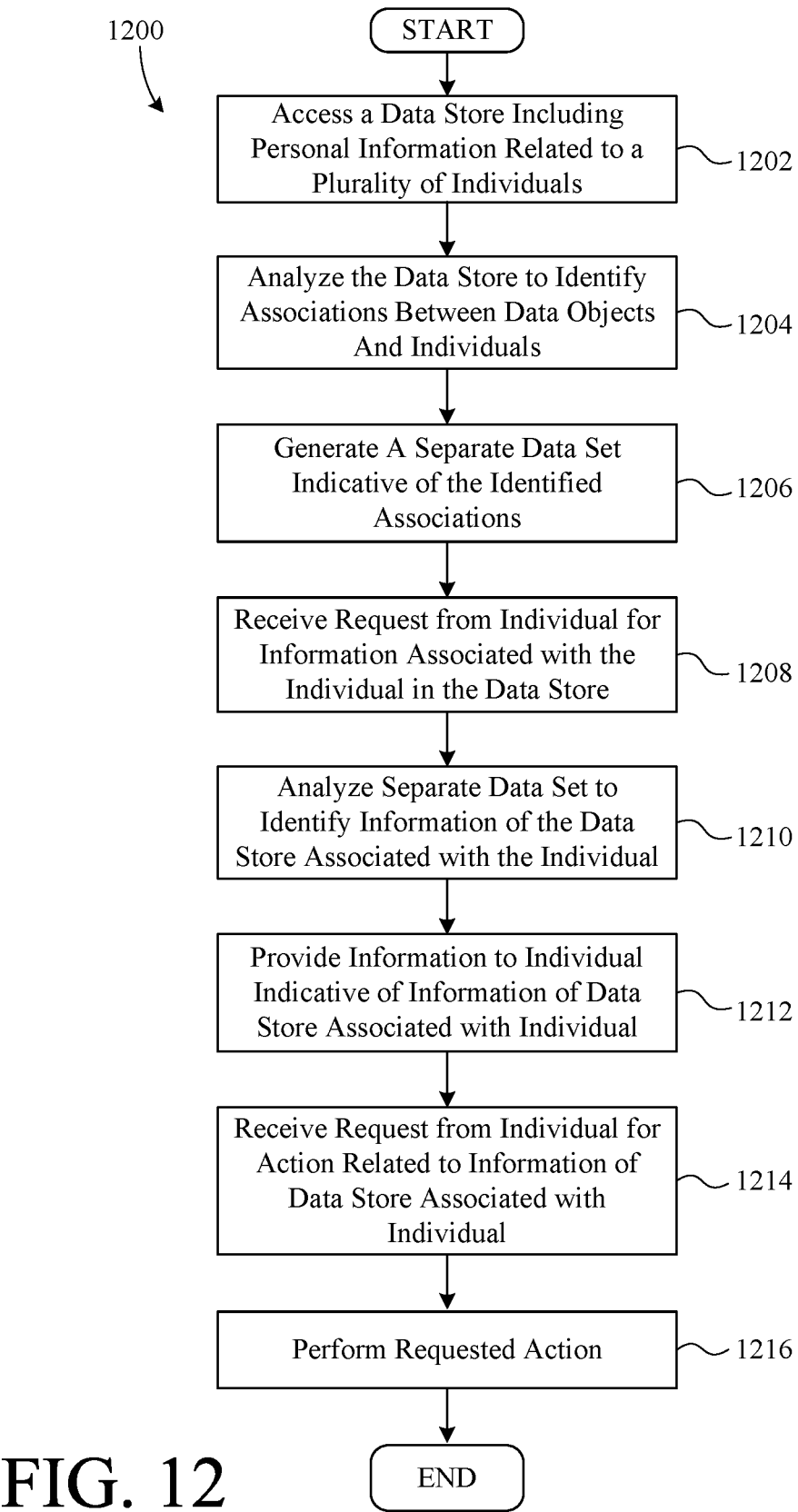
FIG. 12 is a flowchart summarizing an example method for responding to an SAR.

FIG. 12 is a flow chart illustrating an example method 1200 for serving SARs. In a first step 1202, a data store is accessed. The data store includes personal information related to a plurality of individuals. In a second step 1204 the data store is analyzed to identify associations between data objects and the individuals. Next, in a third step 1206, a separate data set is generated. The separate data set is indicative of the associations identified in step 1204. Then, in a fourth step 1208, a request is received from an individual. The request is for information regarding personal information in the data store that might be associated with the individual. In a fifth step 1210 the separate data set is analyzed to identify information of the data store that is associated with the individual. Then, in a sixth step 1212, information indicative of the information in the data store associated with the individual is provided to the individual. Next, in a seventh step 1214, a request for action related to the information of the data store associated with the individual is received. Finally, in an eighth step 1216, the requested action is performed.

Figure 13:
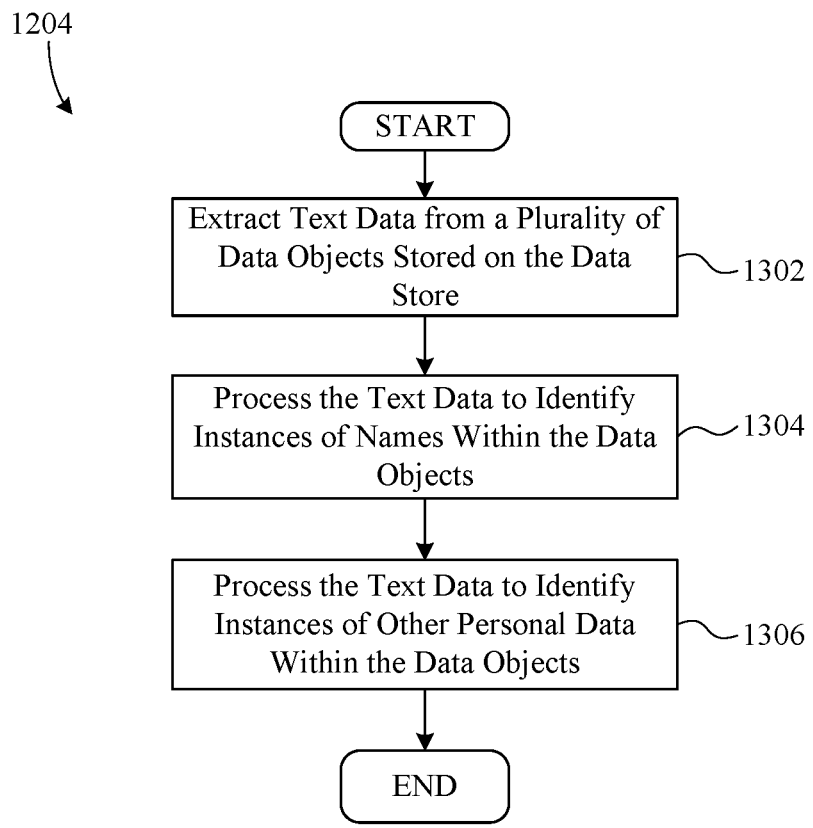
FIG. 13 is a flow chart summarizing an example method of performing a second step 1204 of the method of FIG. 12.

FIG. 13 is a flow chart summarizing an example method of performing second step 1204 of method 1200. In a first step 1302, text data is extracted from a plurality of data objects stored on the data store. Then, in a second step 1304, the text data is processed to identify instances of names within the data objects. Finally, in a third step 1306, the text data is processed to identify instances of personal data within the data objects.

Figure 14:
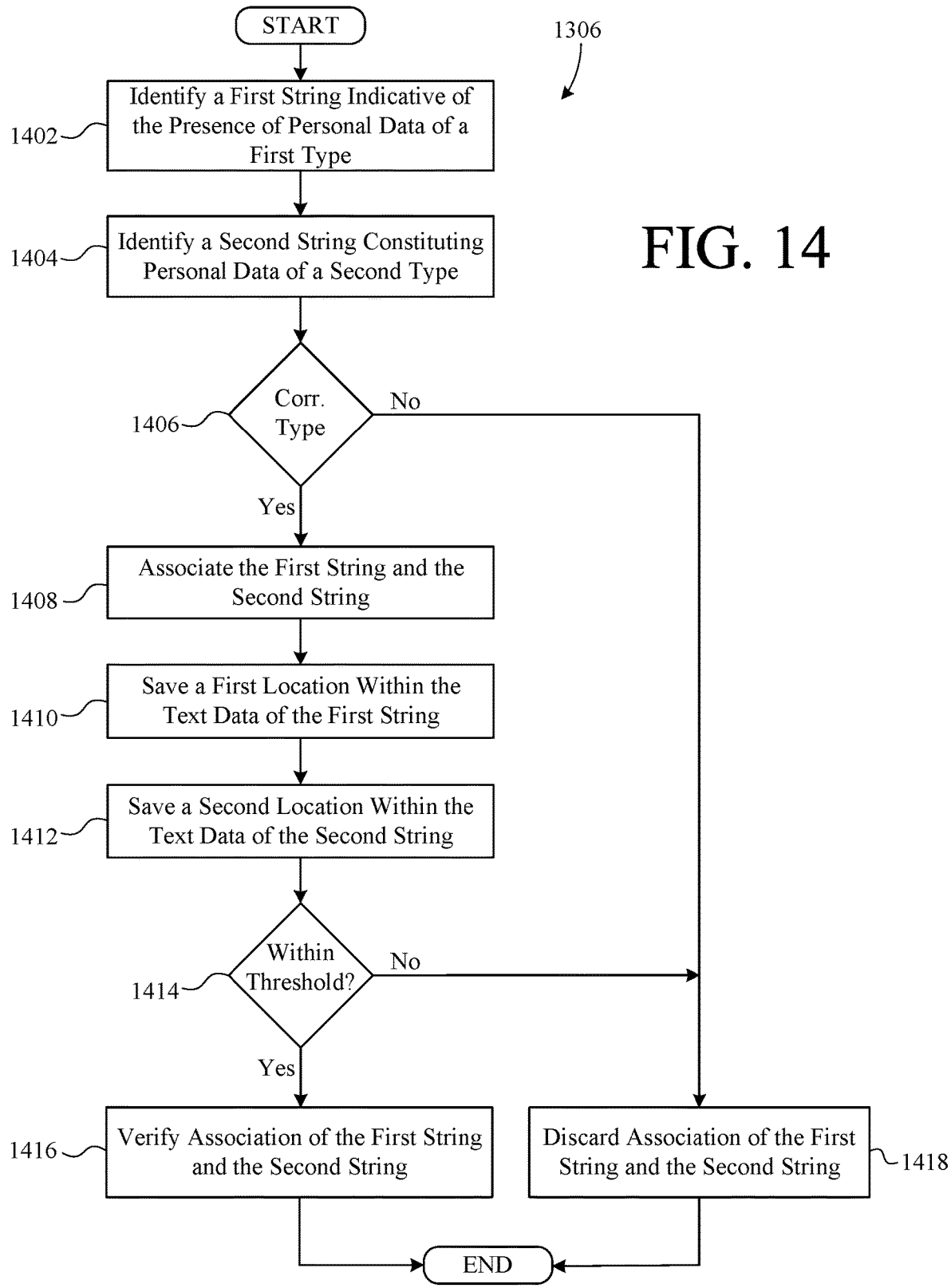
FIG. 14 is a flow chart summarizing an example method of performing a third step 1306 of the method of FIG. 12.

FIG. 14 is a flow chart summarizing an example method of performing third step 1306 of method 1200. In a first step 1402, a first string indicative of the presence of personal data of a first type is identified. Then, in a second step 1404, a second string constituting personal data of a second type is identified. In a third step 1406, it is determined whether the first type of personal data and the second type of personal data correspond (e.g., both corresponding to a birthdate as "D.O.B." and "01/01/2001"). If it is determined that the first type and the second type do correspond, then method 1200 proceeds to a fourth step 1408, in which the first string and the second string are associated. Next, in a fifth step 1410, a first location of the first string within the text data is stored. Similarly, in a sixth step 1412, a second location of the second string within the text data is stored. Then, in seventh step 1414, it is determined whether the first location and the second location are within a threshold distance from one another. If it is determined that the first location and the second location are within the threshold distance from one another, method 1200 proceeds to an eighth step 1416, in which the correspondence of the first sting and the second string is verified. Upon completion of eighth step 1416, step 1306 ends. If in third step 1406 it is determined that the first type and the second type do not correspond, or in seventh step 1414 that the first location and the second location are not within the threshold distance from one another, then method 1200 proceeds to a ninth step 1418. In ninth step 1418, the association of the first string and the second string is discarded.

Figure 15:
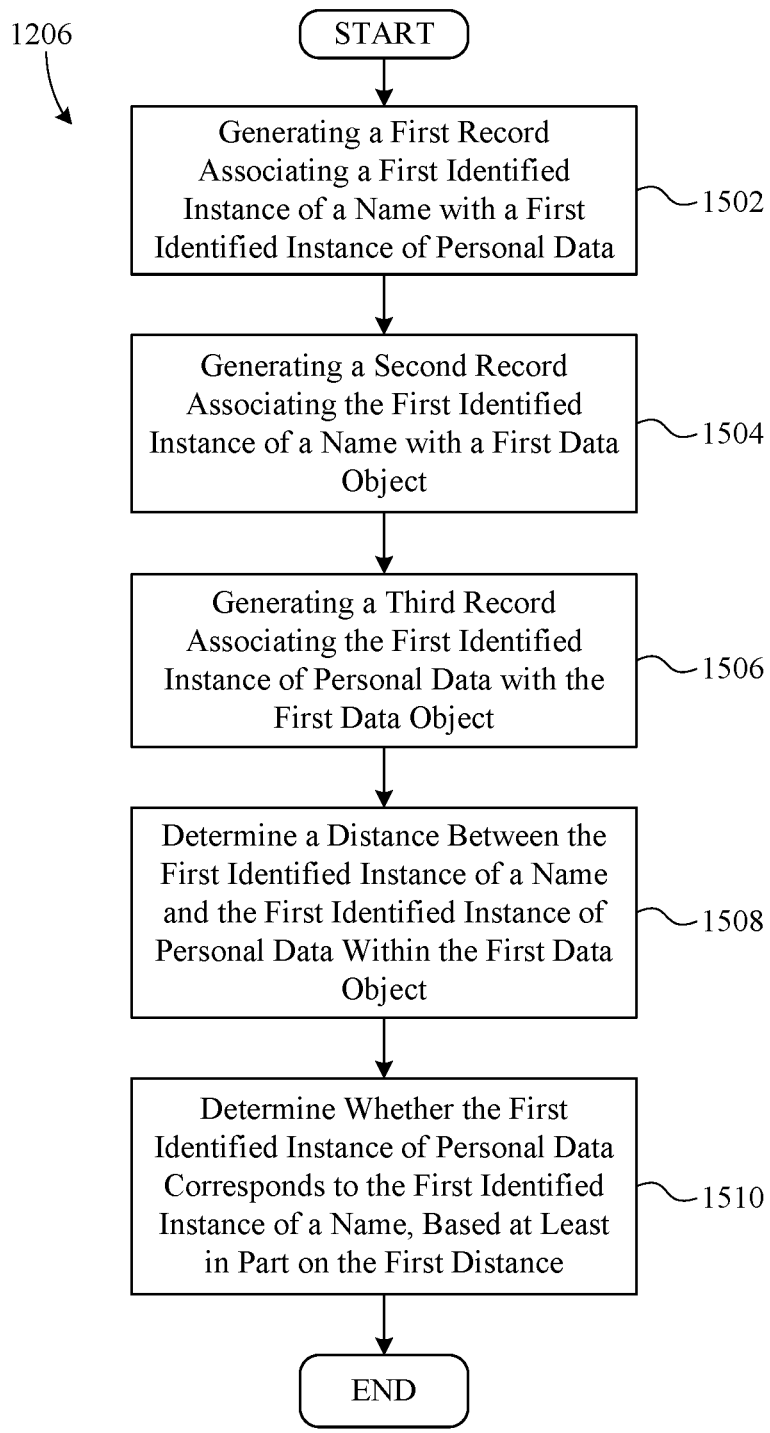
FIG. 15 is a flow chart summarizing an example method of performing a third step 1206 of the method of FIG. 12.

FIG. 15 is a flow chart summarizing an example method of performing third step 1206 of method 1200. In a first step 1502, a first record is generated associating a first identified instance of a name with a first identified instance of personal data. Next, in a second step 1504, a second record is generated, associating the first identified instance of a name with a first data object. Then, in a third step 1506, a third record is generated associating the first identified instance of personal data with the first data object. In a fourth step 1508 a first distance between the first identified instance of a name and the first identified instance of personal data within the first data object is determined and entered into the first record. Finally, in a fifth step 1510, it is determined whether the first identified instance of personal data corresponds to the first identified instance of a name, based at least in part on the first distance.

Figure 16:
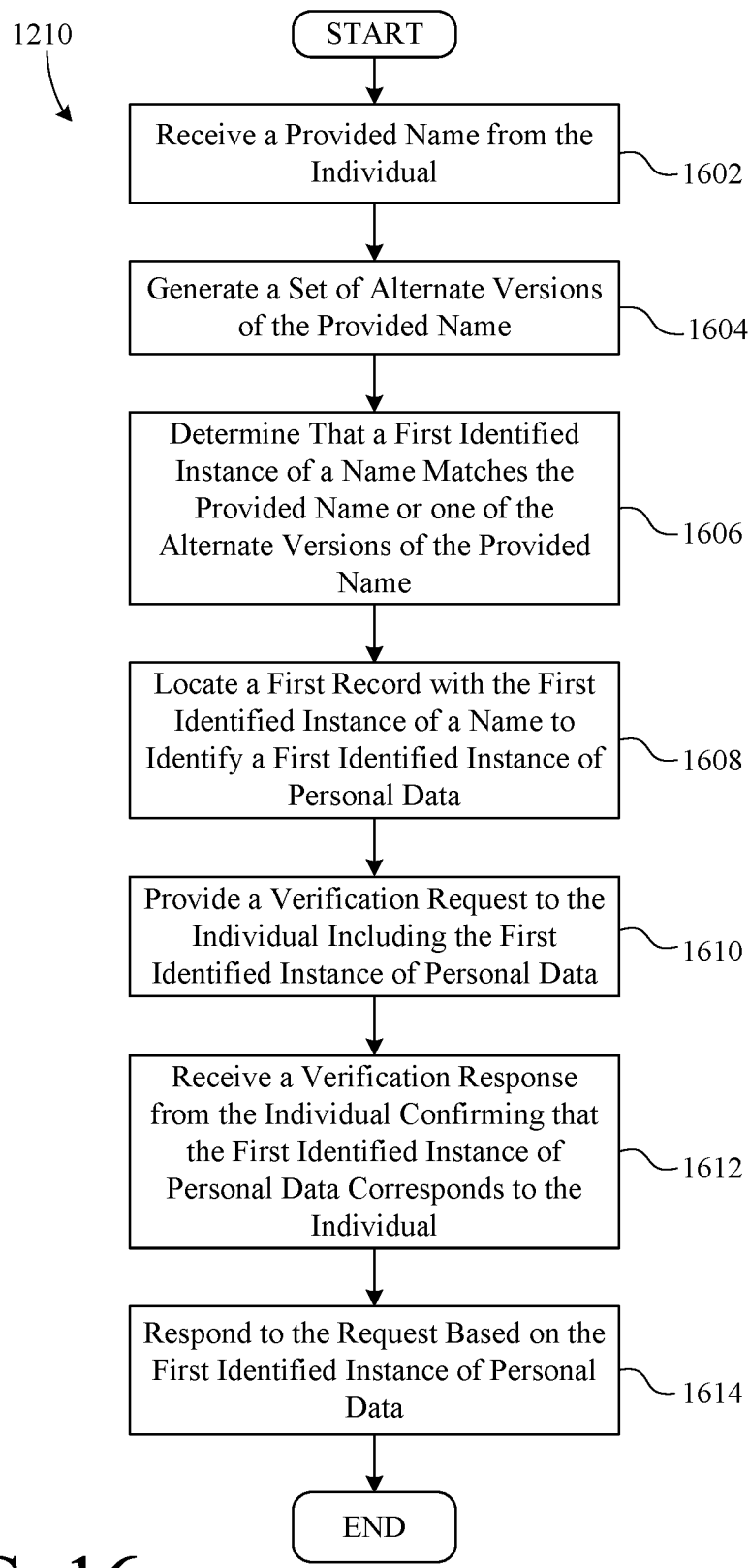
FIG. 16 is a flow chart summarizing an example method of performing a fifth step 1210 of the method of FIG. 12.

FIG. 16 is a flow chart summarizing an example method of performing fifth step 1210 of method 1200. In a first step 1602, a provided name is received from the individual. Next, in a second step 1604, a set (0, 1, or more) of alternate versions of the provided name is generated. Then, in a third step 1606, it is determined that a first identified instance of a name matches the provided name or one of the alternate versions of the provided name. In a fourth step 1608, a first record with the first identified instance of a name is located to identify a first identified instance of personal data. Then, in a fifth step 1610, a verification request is provided to the individual. The verification request includes the first identified instance of personal data. Next, in a sixth step 1612, a verification response is received from the individual. The verification response confirms that the first identified instance of personal data corresponds to the individual. Finally, in a seventh step 1614, the request is responded to based on the first identified instance of personal data.

Figure 17:
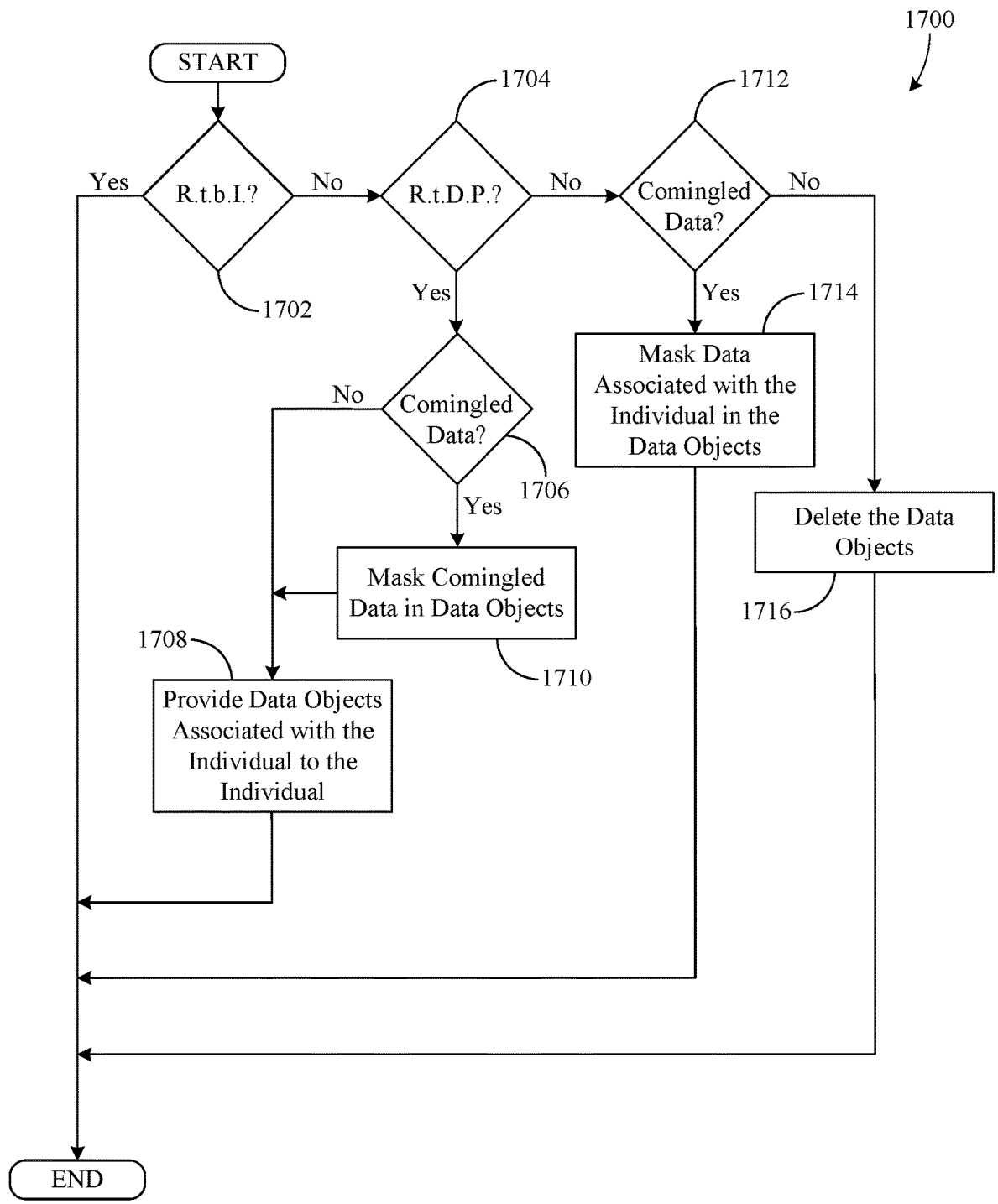
FIG. 17 is a flow chart summarizing an example method 1700 of performing an eighth step of the method of FIG. 12.

FIG. 17 is a flow chart summarizing an example method 1700 of performing eighth step 1216 of method 1200. In a first step 1702, it is determined whether the request is a "right to be informed" request. If the request is a "right to be informed" request, method 1700 ends. If the request is not a "right to be informed" request, method 1700 proceeds to a second step 1704, in which it is determined whether the request is a "right to data portability" request. If the request is a "right to data portability" request, method 1700 proceeds to a third step 1706, where it is determined whether data objects corresponding to the individual contain comingled personal data associated with others. If the data objects do not contain comingled personal data, method 1700 proceeds to a fourth step 1708, in which the data objects are provided to the individual. On the other hand, if the data objects do contain comingled personal data, method 1700 proceeds to a fifth step 1710, in which the comingled data is redacted (e.g., masked, removed, etc.) in the data objects, before proceeding to fourth step 1708. Upon completion of step 1708, method 1700 ends.

If, in second step 1704, it is determined that the request is not a "right to data portability" request, then, by process of elimination, the request must be a "right to be forgotten" request, and method 1700 proceeds to a sixth step 1712. Optionally, it can be affirmatively determined that the request is a "right to be forgotten" request. In sixth step 1712 it is determined whether the data objects include comingled personal data associated with others. If the data objects do contain comingled personal data associated with others, method 1700 proceeds to a seventh step 1714, in which the data associated with the individual is redacted/masked within the data objects, before method 1700 ends. If the data objects do not contain comingled personal data associated with others, step 1216 proceeds to an eighth step 1716, in which the data objects are deleted, and then method 1700 ends.

Figure 18:
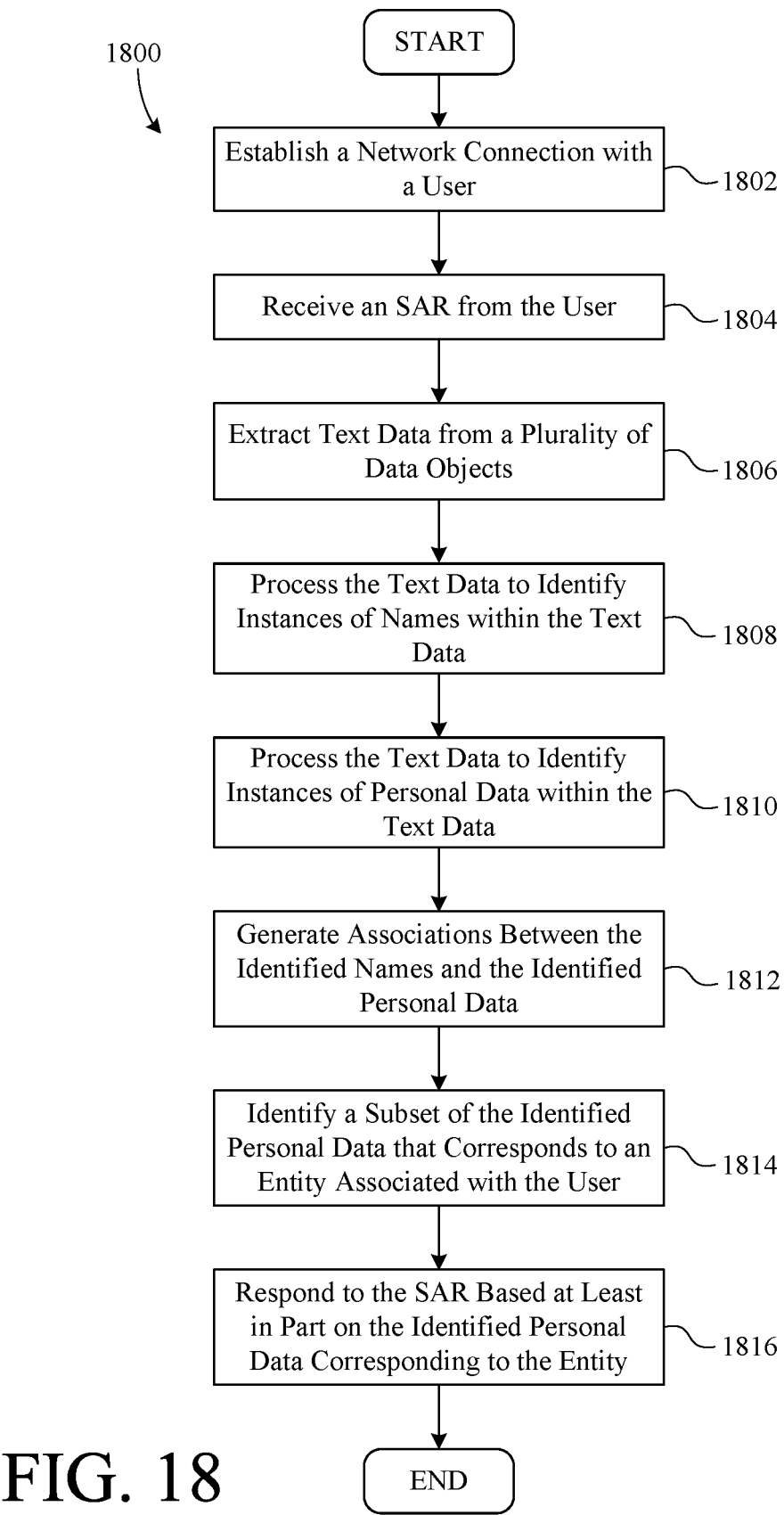
FIG. 18 is a flow chart summarizing another example method 1800 for serving SARs.

FIG. 18 is a flow chart summarizing another example method 1800 for serving SARs. In a first step 1802, a network connection is established with a user. Then, in a second step 1804, an SAR is received from the user. Next, in a third step 1806, text data is extracted from a plurality of data objects. Then, in a fourth step 1808, the text data is processed to identify instances of names within the text data. Next, in a fifth step 1810, the text data is processed to identify instances of personal data within the text data. Then, in a sixth step 1812, associations between the identified names and the identified personal data are generated. Next, in a seventh step 1814, a subset of the identified personal data that corresponds to an entity associated with the user is identified. Finally, in an eighth step 1816, the SAR is responded to based at least in part on the identified personal data corresponding to the entity.

The description of particular embodiments of the present invention is now complete. Many of the described features may be substituted, altered or omitted without departing from the scope of the invention. For example, alternate data types (e.g., relational databases, different formats, etc.), may be substituted for the personal data graph. As another example, alternative methods can be utilized for recognizing names, classifying personal data, generating name variants, etc. In addition, although the invention is illustrated with reference to particular memories, functional blocks, and so on, it should be understood that various embodiments can be implemented with software, hardware, firmware, or any combination thereof. These and other deviations from the particular embodiments shown will be apparent to those skilled in the art, particularly in view of the foregoing disclosure.

We claim:

1. A system for serving subject access requests (SARs), said system comprising:
   at least one hardware processor;
   memory storing data and code, said code including a set of predefined instructions for causing said hardware processor to perform a corresponding set of operations when executed by said hardware processor;
   platform services including a first subset of said set of predefined instructions configured to access a data store, said data store including personal information related to a plurality of persons;
   an association layer including a second subset of said set of predefined instructions configured to analyze said data store to identify associations between information in the data store and individual persons of said plurality of persons;
   a user interface electrically coupled to receive a request from a particular one of said individual persons related to information in said data store associated with said particular one of said individual persons; and
   a case management system including
      a third subset of said set of predefined instructions configured to identify information in said data store associated with said particular one of said individual persons, and
      a fourth subset of said set of predefined instructions configured to respond to said request from said particular one of said individual persons based at least in part on said identified information in said data store associated with said particular one of said individual persons.

2. The system of claim 1, wherein said second subset of said set of predefined instructions is additionally configured to:
   extract text data from a plurality of data objects stored on said data store, said data objects including said personal information;
   process said text data to identify instances of names within said data objects, each of said names corresponding to one of said individual persons of said plurality of persons; and
   process said text data to identify instances of personal data within said data objects.

3. The system of claim 2, further comprising a fifth subset of said set of predefined instructions, wherein said fifth subset of said set of predefined instructions is configured to:
   generate a first record associating a first identified instance of a name with a first identified instance of personal data, said first record indicating that said first identified instance of a name and said first identified instance of personal data were identified within a first data object of said plurality of data objects;
   generate a second record associating said first identified instance of a name with said first data object; and
   generate a third record associating said first identified instance of personal data with said first data object.

4. The system of claim 3, wherein:
   said third subset of said set of predefined instructions is additionally configured to identify a subset of said identified instances of personal data corresponding to said particular one of said individual persons based on said associations; and
   said fourth subset of said set of predefined instructions is additionally configured to respond to said request based at least in part on said subset of said identified instances of personal data corresponding to said particular one of said individual persons.

5. The system of claim 4, wherein said third subset of said set of predefined instructions is further configured to:
   determine that said first identified instance of a name corresponds to said particular one of said individual persons;
   use said first identified instance of a name to locate said first record; and
   use said first record to identify said first identified instance of personal data.

6. The system of claim 5, wherein said third subset of said set of predefined instructions is further configured to:
   receive from said particular one of said individual persons a provided name;
   generate a set of alternate versions of said provided name; and
   determine that said first identified instance of a name matches said provided name or one of said set of alternate versions of said provided name.

7. The system of claim 5, wherein:
   said fifth subset of said set of predefined instructions is further configured to enter into said first record a first distance between said first identified instance of a name and said first identified instance of personal data within said first data object of said plurality of data objects; and
   said third subset of said set of predefined instructions is further configured to determine that said first identified instance of personal data corresponds to said particular one of said individual persons based at least in part on said first distance.

8. The system of claim 5, wherein said user interface is configured to:

provide a verification request to said particular one of said individual persons, said verification request including said first identified instance of personal data; and receive a verification response from said particular one of said individual persons, said verification response confirming that said first identified instance of personal data corresponds to said particular one of said individual persons.

9. The system of claim 5, wherein said user interface is configured to:

provide a first copy of said first digital object to said particular one of said individual persons; and wherein said first digital object includes at least one additional identified instance of personal data that does not correspond to said particular one of said individual persons, said additional identified instance of personal data being rendered inaccessible to said particular one of said individual persons in said first copy.

10. The system of claim 5, wherein said case management system additionally includes a sixth subset of said set of predefined instructions configured to:

delete said first digital object from said data store; and wherein said first digital object contains only identified instances of personal data that correspond to said particular one of said individual persons.

11. The system of claim 5, wherein said case management system additionally includes a sixth subset of said set of predefined instructions configured to:

generate a first copy of said first digital object;

redact every instance of said first identified instance of a name and every instance of said first identified instance of personal data from said first copy; and replace said first digital object with said first copy of said first digital object.

12. The system of claim 4, wherein:

said fifth subset of said set of predefined instructions is additionally configured to generate a data set indicative of said associations between said information in said data store and said individual persons of said plurality of persons;

said user interface is configured to receive at least one piece of personal data corresponding to said particular one of said individual persons; and said third subset of said set of predefined instructions is further configured to utilize said at least one piece of personal data to identify associated data in said data set.

13. The system of claim 2, wherein said second subset of said set of predefined instructions is further configured to:

identify a first string indicative of the presence of personal data of a first type in said text data;

identify a second string constituting personal data of a second type in said text data; and associate said first string with said second string if said first type and said second type correspond.

14. The system of claim 13, wherein said second subset of said set of predefined instructions is further configured to:

save first location information indicative of a first location of said text data of said first string;

save second location information indicative of a second location of said text data of said second string; and compare said saved first location information and said saved second location information to verify that said first string and said second string are associated with one another.

15. The system of claim 13, wherein a further subset of said second subset of said set of predefined instructions constitutes a machine learning model trained to detect a plurality of patterns indicative of a plurality of types of personal data.

16. A method for serving subject access requests (SARs), said method comprising:

accessing a data store, said data store including personal information related to a plurality of persons;

analyzing said data store to identify associations between information in said data store and individual persons of said plurality of persons;

receiving a request from a particular one of said individual persons related to information in said data store associated with said particular one of said individual persons;

identifying information in said data store associated with said particular one of said individual persons; and responding to said request from said particular one of said individual persons based at least in part on said identified information in said data store associated with said particular one of said individual persons.

17. The method of claim 16, wherein said step of analyzing said data store includes:

extracting text data from a plurality of data objects stored on said data store, said data objects including said personal information;

processing said text data to identify instances of names within said data objects, each of said names corresponding to one of said individual persons of said plurality of persons; and processing said text data to identify instances of personal data within said data objects.

18. The method of claim 17, further comprising:

generating a first record associating a first identified instance of a name with a first identified instance of personal data, said first record indicating that said identified instance of a name and said first identified instance of personal data were identified within a first data object of said plurality of data objects;

generating a second record associating said first identified instance of a name with said first data object; and generating a third record associating said first identified instance of personal data with said first data object.

19. The method of claim 18, wherein:

said step of identifying information in said data store includes identifying a subset of said identified instances of personal data corresponding to said particular one of said individual persons based on said associations; and said step of responding to said request includes responding to said request based at least in part on said subset of said identified instances of personal data corresponding to said particular one of said individual persons.

20. The method of claim 19, wherein said step of identifying a subset of said identified instances of personal data corresponding to said particular one of said individual persons includes:

determining that said first identified instance of a name corresponds to said particular one of said individual persons;

using said first identified instance of a name to locate said first record; and using said first record to identify said first identified instance of personal data.

* * * * *